United States Patent
Nakamura

(10) Patent No.: US 8,463,874 B2
(45) Date of Patent: Jun. 11, 2013

(54) METHOD AND SYSTEM OF RECORDING AND REPRODUCING WEB APPLICATION OPERATION

(75) Inventor: Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 12/845,407

(22) Filed: Jul. 28, 2010

(65) Prior Publication Data

US 2011/0066704 A1 Mar. 17, 2011

(30) Foreign Application Priority Data

Sep. 14, 2009 (JP) .................................. 2009-211893

(51) Int. Cl.
*G06F 15/16* (2006.01)
(52) U.S. Cl.
USPC .......................................... 709/219; 709/224
(58) Field of Classification Search
USPC ........................................................ 709/219
See application file for complete search history.

(56) References Cited

U.S. PATENT DOCUMENTS

| | | |
|---|---|---|
| 2007/0150556 A1 | 6/2007 | Fukuda et al. |
| 2008/0126931 A1 | 5/2008 | Kojima et al. |
| 2009/0106769 A1 | 4/2009 | Nakamura |
| 2010/0088354 A1* | 4/2010 | Wu et al. ........................ 707/827 |
| 2010/0115091 A1* | 5/2010 | Park et al. ...................... 709/224 |
| 2011/0213822 A1* | 9/2011 | Yavilevich ..................... 709/202 |

FOREIGN PATENT DOCUMENTS

| | | |
|---|---|---|
| JP | 2007-172377 A | 7/2007 |
| JP | 2008-117093 A | 5/2008 |
| JP | 2008-304969 A | 12/2008 |
| JP | 2009-104267 A | 5/2009 |

* cited by examiner

*Primary Examiner* — Lynn Feild
*Assistant Examiner* — Bryan Lee
(74) *Attorney, Agent, or Firm* — Crowell & Moring LLP

(57) ABSTRACT

A web server transmits an identifier related to a web page to a log linking server when the formed web page is transmitted to a web browser, inserts an operation log acquiring function operated by the web browser and at least a portion of the identifier to the web page to be transmitted to the web browser. The web browser requests the web page to the web server, and forms and preserves an operation log on the web page by executing the operation log acquiring function inserted to the received web page. The log linking server preserves the received identifier, requests the operation log of the web page related to the identifier selected by an interface of an external reproducing device to the web browser, and collects and reproduces the operation log.

10 Claims, 16 Drawing Sheets

FIG. 6

| SELECTION | SUM-UP NO. | TIME | CLIENT ID | USER ID | SESSION ID | PAGE ID |
|---|---|---|---|---|---|---|
| | ALL ▶ | ALL ▶ | ALL ▶ | ALL ▶ | ALL ▶ | ALL ▶ |
| ○ | 1 | 10:00:00 | aaa.bbb.ccc.001 | user1 | xxxyyyzzz001 | ppp-001 |
| ○ | 2 | 10:01:00 | aaa.bbb.ccc.002 | user2 | xxxyyyzzz002 | ppp-002 |
| ○ | 3 | 10:02:00 | aaa.bbb.ccc.003 | user3 | xxxyyyzzz003 | ppp-003 |
| ○ | ... | ... | ... | ... | ... | ... |

IDENTIFIER LIST

METHOD AND SYSTEM OF RECORDING AND REPRODUCING WEB APPLICATION OPERATION

CLAIM OF PRIORITY

The present application claims priority from Japanese patent application JP 2008-211893 filed on Sep. 14, 2009, the content of which is hereby incorporated by reference into this application.

FIELD OF THE INVENTION

The present invention relates to a technology of processing to record and reproduce an operation of a web application.

BACKGROUND OF THE INVENTION

In recent years, various services are realized by web applications owing to an availability by which the services are available only by a web browser. A web application is made to be able to provide a service on web by developing a web application having various functions and rich in an expressing power even not by a big enterprise which is rich in experts and resources by spreading lightweight script language and providing a development environment replete with functions at low cost. Further, a web service of a user participating type has also appeared, and in accordance therewith, there are frequently seen cases in which a content on web is dynamically changed, and a promptness of information, and information from various sources are available, and therefore, a scene of using a web service is spreading.

Under the background, in business and social life, web applications are widely used, and an easiness of using a web application effects a remarkable influence on a business efficiency or success or failure of a business. Therefore, a provider of a service using a web application is strongly interested in how a web application is used.

Conventionally, a web application have allocated respectively separate web pages to individual information or operation, and realized a processing consisted by provision of a series of information or plural operations by a transition of web pages. Therefore, by analyzing an access log to a web server executing a web application, a transition of web pages is known, and it can be understood to some degree how a web application is used. However, in recent times, a large amount of information is made to be able to be provided, or plural operations are made to be able to carry out by a single web page by a method of embedding script language or the like to a web page. Therefore, it becomes to a higher degree and complicated how a web application is used. In an access log of a web server in which only a record by a unit of web page remains, it is not made to be able to understand sufficiently how the web application which is to a higher degree and complicated is used. Hence, in a web application, there is requested a technology of carrying out a record by a unit of an operation on a web page which is finer than a unit of the web page, and reproducing and confirming the record.

In contrast thereto, as a background art, there has been well utilized a method of taking an image of and reproducing an operation of a web application by taking a video thereof. However, the method poses a problem that the method is not suitable for recording/reproducing continuously and by a large amount. Further, also in a method of recording/reproducing a record by installing a dynamic image capture tool of carrying out a capture of a screen on a client PC (Personal Computer) in which a web browser reading a web page is operated, there poses a problem of taking time. Although there also is a tool of recording an operation log on a client PC instead of capturing a screen by a technology similar to the dynamic image capture tool similar to the dynamic image capture tool, there poses a problem that an operation of installing to a client PC is needed, and the technology is difficult to be introduced under an environment of the internet or the like.

Further, there also is a technology of recording/reproducing a user operation of a web browser with regard to a web page or a background communication processing content as in "Method and apparatus of recording/reproducing user operation" of Patent document 1 (JP-A-2008-117093).

Further, there is disclosed a technology which preserves an input state on a web page on a server without a special operation, and in which even when session timeout or unexpected server shutdown occurs, an operation can be continued by reproducing an input state before the occurrence in "Successive preserving type web application system" of Patent document 2 (JP-A-2008-304969).

Further, there is disclosed means for storing a data which can specify an input state which occurs dynamically by an event from outside or a state of an internal variable by a Web page of using DHTML (Dynamic HyperText Markup Language) in "Method of analyzing transition of state at Web page" of Patent document 3 (JP-A-2007-172377).

Further, there is disclosed a method which simply and easily realizes to grasp a situation of a processing in a total of a web system and which scalably deals with also an increase in a number of clients or the like, in "Method of recording processing and apparatus of recording processing of web application" of Patent document 4 (JP-A-2009-104267) according to an invention of the inventors.

SUMMARY OF THE INVENTION

However, in Patent document 1, there is not a means for selectively carrying out recording of an operation, there is not also provided a means for designating which user carries out reproducing by constituting an object by which operation in reproducing, and therefore, there pose a problem that a scalability cannot be ensured when a number of users is large. Further, there also poses a problem that there is not a means for preserving a content of a web page, and recording/reproducing of a dynamic content by which contents of web pages are dynamically changed cannot correctly be carried out.

Further, according to the technology of Patent document 2, although an input state can be recalled, reproducing of an operation until reaching the input state cannot accurately be carried out, a communication for preserving the input state periodically is generated between a client and a server, and therefore, there poses a problem that a scalability cannot be ensured when a number users is large.

Further, according to the technology of Patent document 3, there is not provided a means for designating selectively a portion which is intended to record/reproduce from plural operations of plural users, and therefore, there poses a problem that a scalability cannot be ensured when a number of users is large.

In view of the background art, and the prior art described above, a problem that the present invention intends to address is as follows:

First, the problem is that an operation of a web application is made to be able to be recorded/reproduced continuously even when a number of users is large. For that purpose, it is necessary that the present invention is easy to be introduced, and is made to be able to record/reproduce an operation selectively.

Although in Patent document 4 which is the invention of the inventors, there is disclosed the method of recording an operation of a web application without installing a tool to a client, or changing a web application executed on a server or the like, there poses a problem that there is not provided a means for selecting and reproducing a recorded operation, further, an operation cannot be recorded/reproduced correctly with regard to a dynamic content in which a content of a web page is changed dynamically.

Further, in a web system constituted by a web server or a web browser, there is frequently provided a cache in order to improve a response performance of a web page, or alleviate a network load. When a cache is hit, a request does not arrive at the web server, and an operation is carried out by loading a web page the same as that formed therebefore on the web browser. It is a problem that the operation is made to be able to be recorded/reproduced by being differentiated from an operation which has been carried out on the web page therebefore even in such a case.

It is an object of the present invention to provide a method and an apparatus of recording/reproducing an operation of a web application which can continuously record/reproduce the operation of the web application which a number of users use, further, a method and a web system of recording/reproducing an operation of a web application which can be reproduced correctly even in a web application including a dynamic content, or even when a cache is included in the web system.

In order to achieve the above-described object, according to an aspect of the present invention, there are provided a method and a system of recording/reproducing an operation of a web application which are a method and a system of recording/reproducing an operation of a web application in a web system constituted by a web server of executing a web application, a web browser of displaying a web page, a log linking server of preserving an operation log on the web page, and a network of connecting these to each other, in which when the web server transmits the formed web page to the web browser, the web server transmits an identifier related to the web page to the log linking server, and inserts an operation log acquiring function operated by the web browser, and at least a portion of the identifier to the web page to be transmitted to the web browser, the web browser executes the operation log acquiring function inserted to the web page received by transmitting a request, forms an operation log on the web page, and preserves the operation log by relating the operation log to the identifier, and the log linking server preserves the identifier transmitted from the web server, selects a specific identifier from the preserved identifier, transmits a request for the operation log of the web page related to the selected identifier to the web browser, and receives the operation log from the web browser.

That is, in the method and the system of recording/reproducing an operation of a web application according to another aspect of the present invention, at the web server operated by the web application, a client PC or a user requesting the web page formed by the web application or the identifier inherent to the web page is preserved, further, an operation on the web browser is recorded on the client PC as the operation log, presence or absence of a request from outside is determined, and a function of transmitting the operation log recorded in accordance with the request is inserted to the web page. Further, the operation log can be collected and reproduced selectively from the operation logs of a number of users by providing an interface which can display and select a table of the identifiers preserved on a side of the web server, and enabling the client PC having the operation log related to the selected identifier to determine a selected content.

Further, according to still another aspect of the present invention, with regard to a dynamic content, the dynamic content can correctly be reproduced by preserving a content of a web page included in a response by corresponding the content to an identifier at the web server, and using the preserved content when reproducing the operation.

Further, according to yet another aspect of the present invention, with regard to recording/reproducing an operation when a cache is hit, recording/reproducing of the operation is correctly realized by transmitting information of the identifier or the like related to the web page displayed on a side of the server device from the client, comparing a table of identifiers preserved on a side of the web server, and information received from the client, and updating the table of identifiers.

By the present invention, an operation of the web application which a number users use can continuously be recorded/reproduced. Further, the operation is made to be able to be reproduced correctly even in a web application including a dynamic content, or even when a cache is included in a web system.

BRIEF DESCRIPTION OF THE DRAWINGS

FIG. 6 is a diagram showing an example of a display screen of displaying a table of identifiers according to the first embodiment;

DETAILED DESCRIPTION OF THE INVENTION

An explanation will be given of various embodiments of the present invention in reference to the drawings as follows.

First Embodiment

An explanation will be given of a method of recording/reproducing an operation of a web application according to a first embodiment in reference to FIG. 1 through FIG. 6.

Figure 1:
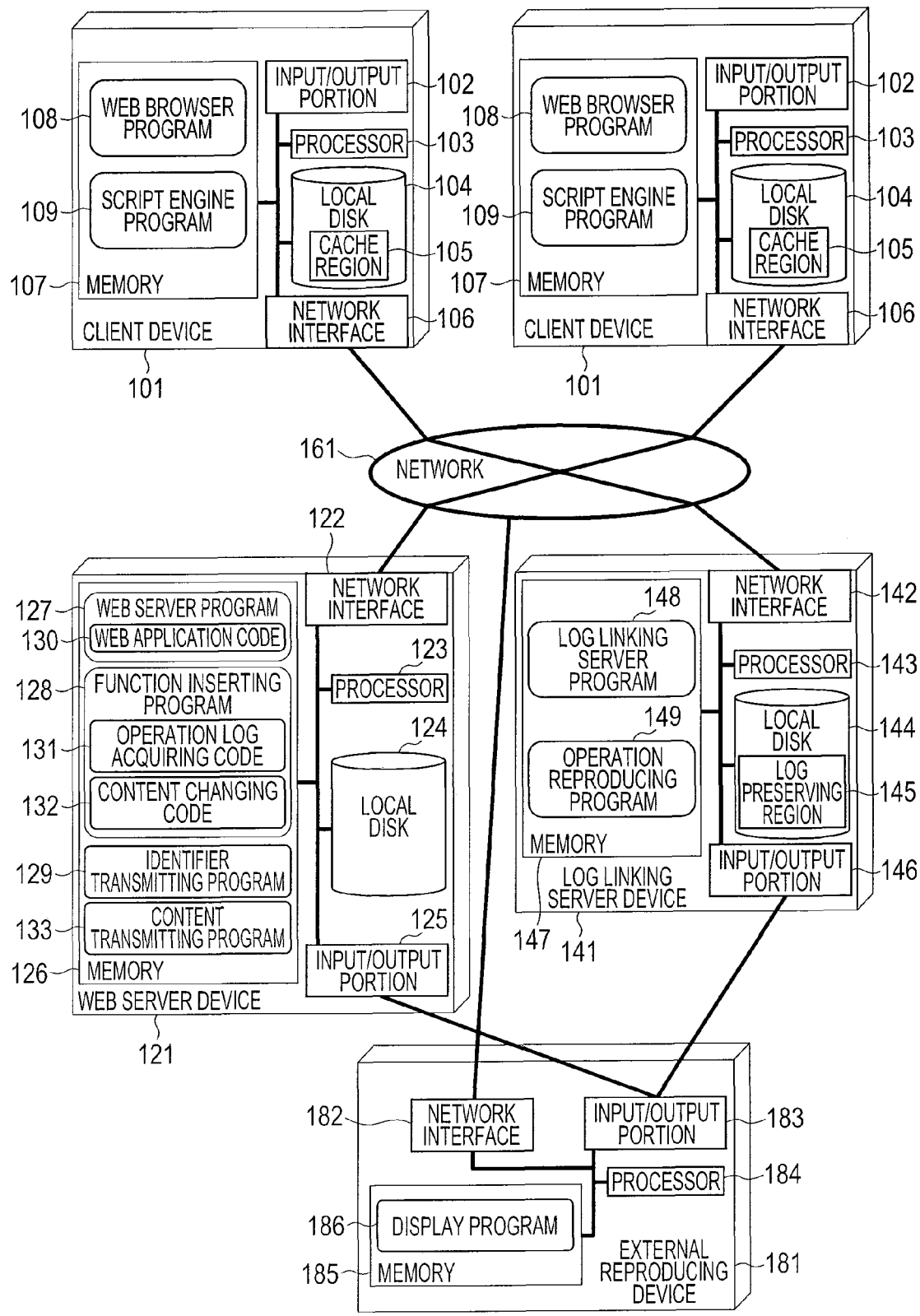
FIG. 1 is a total system constitution diagram of executing a web application according respective embodiments.

FIG. 1 is a system constitution diagram showing an example of a hardware constitution and a software constitution of a system which executes a web application constituting an object by respective embodiments starting from the present embodiment.

Hardware thereof is constituted by a client device 101 of PC or the like, a web server device 121, a log linking server device 141, an external reproducing device 181 which is a reproducing portion, and a network 161 which connects these devices. Further, although in the system constitution of FIG. 1, there is exemplified a case in which the respective devices have respective independent hardware constitutions, the system constitution is not limited to the constitution, but the hardware of each device of the client device, the server device and the like may be realized by the same hardware, or may be constituted by several pieces thereof of an arbitrary number. For example, the web server device 121 and the log linking server device 141 may be realized by the same hardware, and a function of the log linking server may be incorporated in the web server device 121.

As shown by FIG. 1, all of the client device 101, the web server device 121, the log linking server device 141, and the external reproducing device 181 are constructed by ordinary computer constitutions, which have processors 103, 123, 143, and 184 which are processing portions, memories 107, 126, 147, and 185, input/output portions 102, 125, 146, and 183, and network interfaces 106, 122, 142, and 182, which are respectively connected to each other at insides of the devices. The client device 101, the web server device 121, and the log linking server 141 further include local disks 104, 124, and 144. However, portions of the devices may be devoid of portions of these constituent elements.

The memory 107 of the client device 101 is stored with a web browser program 108, and a script engine program 109. The programs are executed by being read by the processor 103 which is the processing portion.

In the respective client devices 101, the web browser program 108 is provided with functions of requesting a web page, receiving a response of the requested web page, interpreting the response and forming a display screen and the like. Further, the script engine program 109 is provided with functions of interpreting a script code included in a response of a web page from the web server device 121, and executing a processing written in the script code at the processor 103.

The input/output portion 102 is connected with a keyboard, a mouse, a monitor or the like, and is used for instructing to execute or stop a program, or displaying a result of executing the program at a monitor. The processor 103 executes a processing by reading a program from the memory 107. The local disk 104 includes a cache region 105 of temporarily preserving a web page as shown in FIG. 1. A network interface 106 transmits and receives a request or a response, and transmits and receives an operation log to and from the web server device by way of the network 161 between the network interface 106 and a device outside of the client device 101.

On the other hand, the memory 126 of the web server device 121 is stored with a web server program 127, a function inserting program 128, an identifier transmitting program 129, and a content transmitting program 133. These programs may be brought into relationships of incorporating each other. For example, the identifier transmitting program 129 may be incorporated in the web server program 127. A web application code 130 is included in or juxtaposed with the web server program 127. An operation log storing code 131 and a content changing code 132 are included in the function inserting program 128. These programs are executed by being read by the processor 123.

The web server program 127 is provided with a function of forming a response of a web page to reply in accordance with a request from an external device of the client device 101 or the like. The function inserting program 128 is provided with a function of adding or modifying a content included a response for the response of a web page.

The identifier transmitting program 129 is provided with a function of forming or acquiring an identifier related to a web page which is formed by the web server program 127, and transmitting the identifier to an external device. As the identifier related to a web page, as described later in details, an ID having a unique value for each request of a web page, an ID which can specify a source of a request of a web page or the like is pointed out.

The content transmitting program 133 is provided with a function of transmitting a content of a web page formed by the web server program 127 to an external device. Although the web server program 127 is also provided with a function of transmitting a content of a web page to a client device which is a source of a request, the content transmitting program 133 can transmit a content to an external device other than a source of a request of the log linking server device 141, the external reproducing device 181 or the like, and at that occasion, the content transmitting program 133 transmits a content by relating the content to an identifier which is related to a web page.

The input/output portion 125, the processor 123, and the network interface 122 are provided with functions the same as those of devices of the same titles which are present in the client device 101. The local disk 124 is stored with a total, a portion or the like of a web page.

The memory 147 of the log linking server device 141 is stored with a log linking server program 148, and an operation reproducing program 149. These programs are executed by being read by the processor 143.

The log linking server program 148 receives data of an identifier for specifying a web page, a source of a request for a web page or the like, an operation log or the like which is transmitted from the client device 101, the web server device 121 or the like, stores these at a log preserving region 145 of the local disk 144, reads the data which are present on the log preserving region 145 and the memory 147, displays the data in a table, or makes a specific identifier, an operation log or the like selected, and transmits these to an external device. Further, the log linking server program 148 makes an external device transmit an operation log related to a specific identifier. The operation reproducing program 149 provides a function of making the external reproducing device 181 reproduce an operation on a web page from a content and an operation log of a web page on the external reproducing device 181 in accordance with a request from the external reproducing device 181.

The local disk 144 is provided with the operation log preserving region 145 of preserving an identifier or an operation log. The input/output portion 146, the processor 143, and the network interface 142 are provided with functions the same as those of the devices of the same titles which are present at the web server device 121.

The memory 185 of the external reproducing device 181 is stored with a display program 186. The display program 186 is executed by being read by the processor 184. The display program 186 displays a web page similar to the web browser program 108, and the script engine program 109 of the client device 101. However, an operation on a web page is reproduced, or reproducing is temporarily stopped by being linked with an operation log by the operation reproducing program 149 of the log linking server device 141. The input/output portion 183, the processor 184, and the network interface 182 are provided with functions the same as those of the devices of the same titles which are present in the web server device 121.

An explanation will be given of a flow of processing to record/reproduce an operation of a web application in reference to FIG. 2 through FIG. 4.

As has been explained in reference to FIG. 1, in the system in which the client device 101, the web server device 121, and the log linking server device 141 are connected by the network 161, the client device 101 transmits a request for a web page, the web server device 121 forms a response of a requested web page to reply, the client device 101 displays a web page, or executes a script code, and the log linking server device 141 is accumulated with an identifier related to a web page, a content of a web page, an operation log on the web page and the like. Further, transmission and reception of an operation log, an inquiry for realizing a control of a log operation and exchange of a command of transmitting a control content are also carried out between the log linking server device 141, and the client device 101. The external reproducing device 141 which functions as the reproducing portion reproduces a content of a web page from the log linking server device 141, and an operation on a web page by receiving an operation log.

An explanation will be given of a series of processings successively as follows. Further, in diagrams of FIG. 2 and thereafter, a state in which a program is executed on a processor is referred to as module. For example, when a web browser program is executed on a processor, the state is referred to as web browser module.

Figure 2:
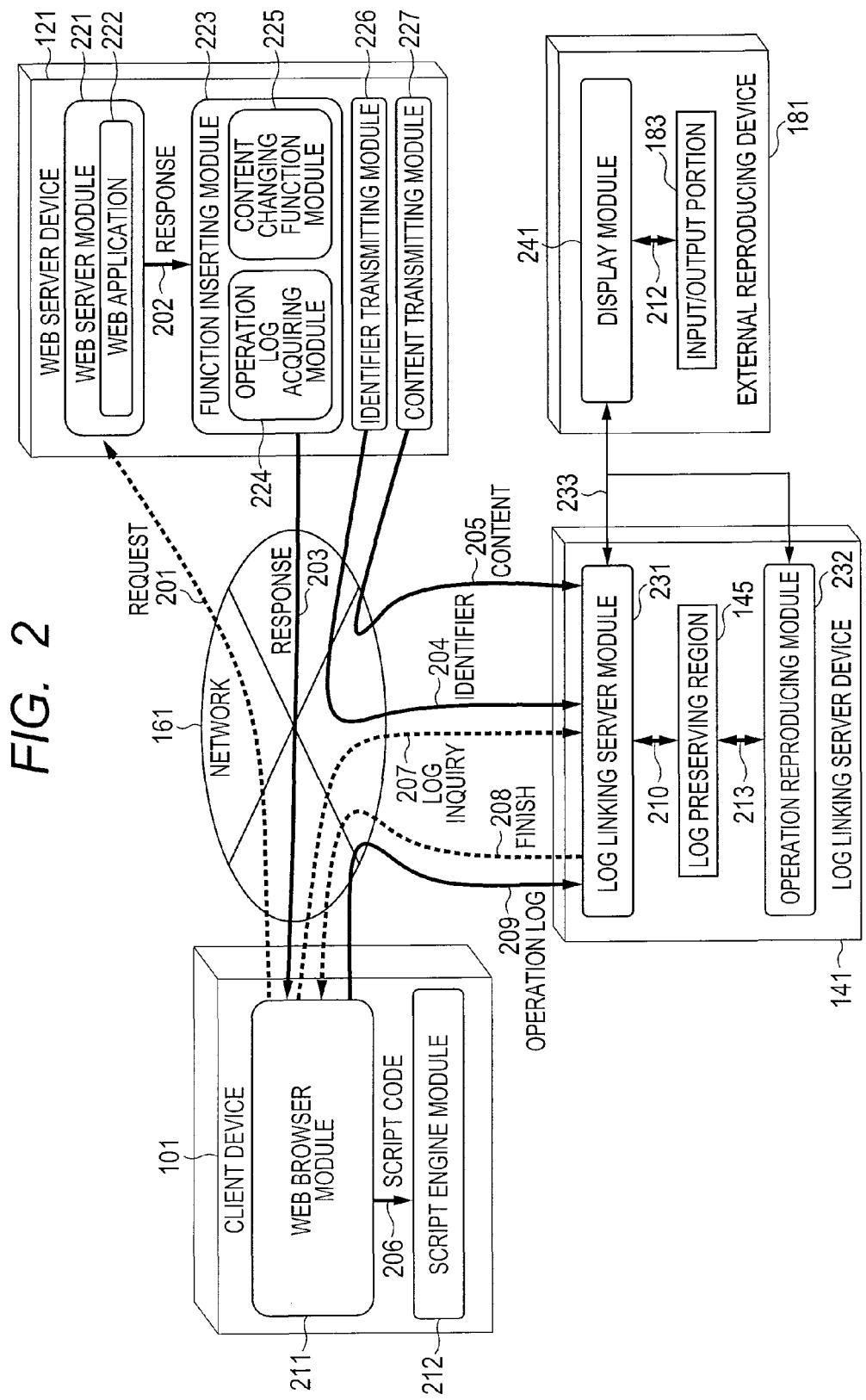
FIG. 2 is a diagram showing a flow of processing to record/reproduce an operation of a web application in the system constitution of FIG. 1.

As is apparent in FIG. 2, first, a web browser module 211 of the client device 101 transmits a request 201 of a web page to the web server device 121 by way of the network 161. The request 201 at least includes URI (Uniform Resource Identifiers) of designating a location at which a web page is present. At the web server device 121, the web server module 221 receives the request 201, and a web application 222 which carries out a processing in accordance with the web application code 130 forms a response 202 of the requested web page.

The response 202 is transmitted to the web browser module of the client device 101 as a response 203 by way of a function inserting module 223 included in the web server device 121. An operation log acquiring function module 224 of the function inserting module 223 inserts a function of acquiring an operation log on the web browser module 211 to the response 202 in a mode of a script code 206 executed on a script engine module 212 included in the client device 101. On the other hand, a content changing function module 225 is provided with a function of changing a portion of a content included in the response 202, and inserts an identifier related to the response to the content.

At the web server device 121, an identifier transmitting module 226 further forms or acquires an identifier 204 related to the response 202 of a web page and transmits the identifier 204 to the log linking server device 141. Further, a content transmitting module 227 transmits a content 205 of a web page included in the response 202 to the log linking server device 141. These operations may be carried out successively, or simultaneously in parallel.

At the client device 101, the content included in the response 203 is displayed by the web browser module 211, and in accordance with an operation, a next request is transmitted, and the script code 206 included in the content is executed by the script engine module 212. Also the script code inserted by the operation log acquiring function module 224 described above is executed by the script engine module 212, and the operation log on the web browser module 211 is formed. The formed operation log is preserved along with the identifier on the memory 107 or on the local disk 104 of the client device 101. The operation log acquiring function module 224 of the web server device 121 includes a function of requesting transmission of the operation log, or inquiring presence or absence of the log operation request to the log linking server device 141. When a command 208 is replied to the log inquiry 207, in accordance with the command 208, the operation log preserved on the memory 107 or the local disk 104 is transmitted to the log linking server device 141, or the operation log is deleted. The command 208 also includes a processing other than transmitting the log or deleting the log.

At the log linking server device 141, a log linking server module 231 receives the identifier 204 and the content 205 from the web server device 121, and preserves the identifier 204 and the content 205 at the log preserving region 145 at inside of the local disk 144. Further, the log linking server module 231 displays a table of data of the preserved identifier 204 on a monitor of the external reproducing device 181 or the like, forms a command of transmitting an operation log of a web page related to the selected identifier from the client device 101, transmits the command 208 of log transmission to a log inquiry 207 from the client device 101, receives an operation log 209 from the client device 101, and preserves the operation log 209 at the log preserving region 145. As described above, the command 208 also includes a command for executing a processing other than the log transmission.

An operation reproducing module 232 of the log linking server device 141 has a function of making the external reproducing device 181 display an operation state in accordance with the operation log on a web page by a monitor or the like on the external reproducing device 181 by transmitting the content or the operation log or the identifier of the web page preserved at the log preserving region 145 of the log linking server device 141 to the external reproducing device 181.

At the external reproducing device 181, a display module 241 communicates with the log linking server device 141, for example, displays the table of the identifier preserved in the log linking server device 141 on a monitor of the input/output portion 183 which is an interface portion, selects/designates a specific identifier by an input from a keyboard or the like of the input/output portion 183 which is an interface portion, informs the specific identifier to the log linking server device 141, displays the operation state on a web page by way of the operation reproducing module 232 of the log linking server device 141, or changes the display state in accordance with a designation from the input/output portion 183.

Further, although in FIG. 2, the external reproducing device 181 and the log linking server device 141 are directly connected by a line 233, the external reproducing device 181 and the log linking server device 141 may be connected by way of the network 261, further, the external reproducing device 181 may receive the content or the operation log or the like of the web page from other device of the web server device 121 or the like. Further, as described above, hardware units of the log linking server device 141 and the external reproducing device 181 may be realized as the same hardware, that is, as the log linking server device to which a reproducing portion belongs.

Next, an explanation will be given of a flow of processings of a method of recording/reproducing an operation of a web application in reference to FIG. 3 through FIG. 6. FIG. 3 shows a flow of processing to record an operation, and FIG. 4 shows a flow of processing to reproduce an operation. The flows of the processings shown in FIG. 3 and FIG. 4 may be executed by being switched successively, or may be executed simultaneously in parallel.

Figure 3:
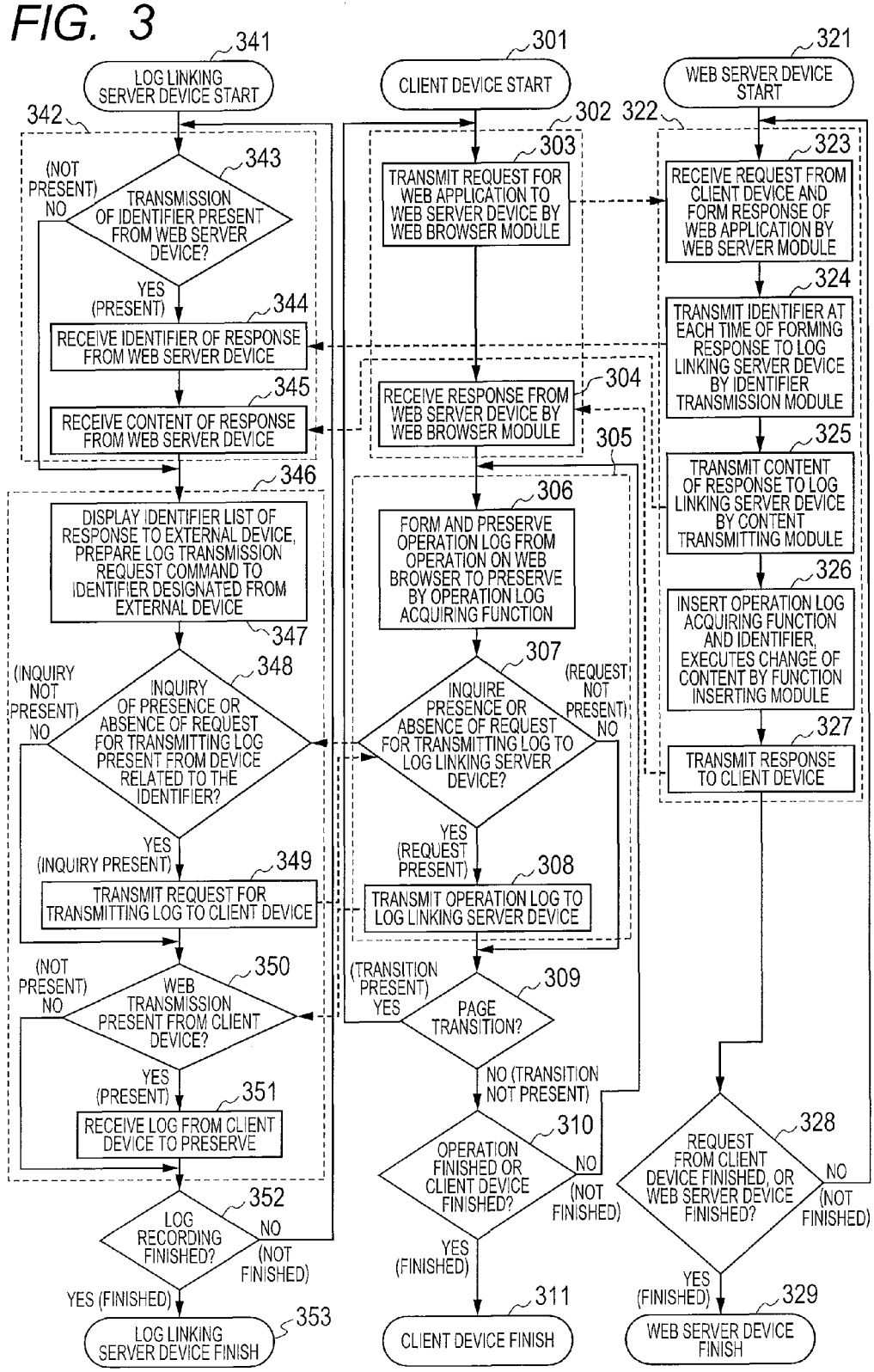
FIG. 3 is a diagram showing a flow of processing to record an operation according to a first embodiment.

First, as shown by FIG. 3, by client device start 301, the web browser module 211 of the client device 101 transmits a request for a web application to the web server device 121 (step 303). At the web server device 121, the web server module 221 forms the response 202 of the web application 222 by receiving the request from the client device 101 (step 323). Further, the identifier transmitting module 226 transmits the identifier 204 to the log linking server device 141 at each time of forming the response (step 324). An explanation will be given of a content and a method of using the identifier in reference to FIG. 5 and FIG. 6.

Successively, the content transmitting module 227 transmits the content of the response to the log linking server device 141 (step 325). Further, the function inserting module changes the content by inserting the operation log acquiring function and the identifier (step 326). With regard to steps 324 through 326, the steps are not limited to an order shown in FIG. 3, but the steps may be executed by an inverse order, or simultaneously in parallel. Finally, the response is transmitted from the web server device 121 to the client device 101 (step 327). A series of processings of steps 323 through 327 are a flow of processings of forming the web page by the web server device 121, and is summarizingly referred to as step 322 in the following. The web server device 121 finishes the processings when the request from the client device 101 is finished, or when the web server device 121 is finished (steps 328, 329).

The client device 101 receives the response from the web server device 121 (step 304). A series of processings of steps 303 and 304 at the client device 101 are a flow of processings of displaying the web page at the client device 101, and is summarizingly referred to as step 302 in the following.

The log linking server device 141 determines whether the identifier is transmitted from the web server device 121 (step 343). When there is a transmission therefrom, the log linking server device 141 receives and preserves the identifier and the content (steps 344, 345). In the following, the processings of communicating with the web server device are summarizingly referred to as step 342.

Successively, the log linking server device 141 forms a list of the preserved identifier, displays the list to the external reproducing device 181, and prepares a command of transmitting an operation log on a web page related to an identifier designated from the external reproducing device 181 (step 347). Reception of the operation log using the command is carried out by a flow of processings as follows.

First, at the client device 101 finished with display of a web page by finishing step 302, by the operation log acquiring function included in the response, an operation log of an operation which is carried out on the web browser is formed and preserved on the memory or the local disk (step 306). Further, the operation log acquiring function inquires presence or absence of a request for transmitting the log to the log linking server device 141 (step 307). At this occasion, the client device 101 transmits an identifier which can specify a displayed web page to the log linking server device 141.

When the log linking server device 141 receives the inquiry of presence or absence of the request for transmitting the log from the client device 101, the log linking server device 141 determines whether the inquiry is an inquiry from an object to which the command prepared at step 347 is to be transmitted (step 348), and transmits the command prepared at the step 347 to the client device 101 in the corresponding case (step 349).

When the client device 101 receives the command, the client device 101 transmits an operation log designated by the command to the log linking server device 141 (step 308). When the log is transmitted from the client device 101 (step 350), the log locking server device 141 receives and preserves the log(step 351). With regard to the flow of a series of processings of receiving the operation log, in the following, a flow of processings on a side of the log linking server device 141 is summarizingly referred to as step 346, and a flow of processings on a side of the client device 101 is summarizingly referred to as step 305.

Further, in the determining processing at step 348, there is a case where even when the identifier received from the client device 101 and the identifier designated at step 347 do not coincide with each other, it is determined that there is the corresponding inquiry, and step 349 is carried out. For example, in a case where there is an identifier of a user which can specify the operating user in the identifier preserved by the log linking server device 141, although the identifier of the user is not included in the identifier transmitted from the client device 101, an identifier of a request having a unique value is included at each time of requesting for a web page, and there is the identifier of the user transmitting the request in relation to the identifier of the request in view of the list of the identifier preserved by the log linking server device 141, it is determined that the inquiry is an inquiry from the same user, and a source of the inquiry is provided with the operation log related to the identifier designated at step 347, and the command is transmitted. In this way, by controlling the list of the identifier at the log linking server device 141, the log linking serve device 141 can acquire a content or an operation of a web page which has been displayed and operated in the past.

Further, it is also acceptable to carry out a method of transmitting an operation log to the log linking server device 141 by determining presence or absence of the operation log corresponding to an object of the command in the preserved operation log on the side of the client device 101 by always transmitting the command to the inquiry of presence or absence of the request for transmitting the log from the client device 101 by omitting the determining processing at step 348 of the linking server device 141.

Finally, at the client device 101, when there is a transition of page, the processing returns to step 302, and when there is not the transition of page, the processing returns to step 305 when the operation is not finished or the client device 101 is not finished, and otherwise, the processing is finished (step 311). Also in the log linking server device 141, when the log recording is not finished, the processing returns to step 342, and otherwise, the processing is finished (steps 352, 353).

Next, an explanation will be given of a flow of processing to reproduce an operation of a web application according to the present embodiment in reference to FIG. 4.

First, by external reproducing device start 441, the external reproducing device 181 requests to transmit the list of the identifier to the log linking server device 141 in order to select an object of reproducing an operation (step 443). When the log linking server device 141 receives the request of transmitting the list of the identifier from the external reproducing device 141, the log linking server device 141 forms and transmits the list of the preserved identifier (step 402). The external reproducing device 181 receives the list of the identifier and displays the list of the identifier (step 444). Steps 443 and 444 are summarizingly referred to as step 442 in the following. A display screen thereof will be exemplified later in reference to FIG. 6.

Next, the external reproducing device 181 selects a portion of reproducing an operation from the list of the identifier and transmits the portion to the log linking server device 141 (step 445). Although a method of selecting the portion differs by information included in the identifier, for example, a reproducing object can be constituted selectively by an operation of a specific user, or the object of reproducing the portion can be constituted selectively by an operation on a specific web page.

When the log linking server device 141 receives a request for transmitting a log or a content from the external reproducing device 181 (step 405), the log linking server device 141 reads an operation log or a content corresponding to the designated identifier from the log preserving region (step 407), and transmits these to the external reproducing device 181 (step 408). Successively, the operation reproducing module transmits a function of reproducing a state of an operation on a web page of an operation reproducing script or the like to the external reproducing device 181 (step 409). In the following, steps 407 through 409 are summarizingly referred to as step 406. The log linking server device 141 repeats the processings until finishing to reproduce an operation.

The external reproducing device 181 receives an operation log and a content, an operation reproducing script or the like from the log linking server device 141 (steps 447, 448), and reproduces a state of an operation on a web page from the operation log and the content received by using the operation reproducing script (step 449). In the following, steps 447 through 449 are summarizingly referred to as step 446. The external reproducing device 181 repeats the processings until finishing to reproduce the operation.

Figure 4:
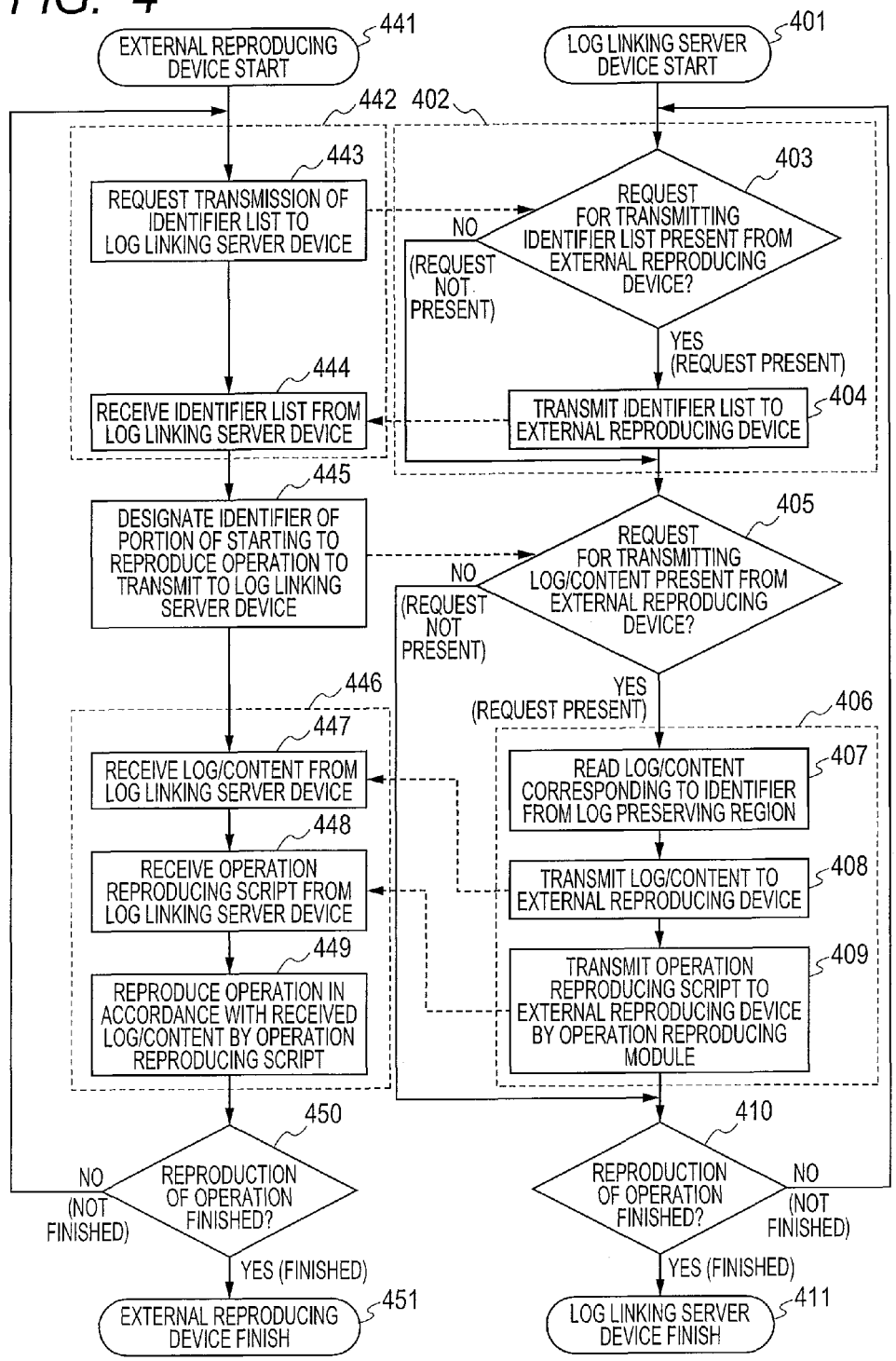
FIG. 4 is a diagram showing a flow of processing to reproduce an operation according to the first embodiment.

As described above, by the recording/reproducing processing of the present embodiment shown in FIG. 3 and FIG. 4, the operation on the web page can be realized to record or reproduce. In the processings, it is not necessary to introduce a special program other than the client device web browser program and the script engine program of the client device. A log or a content of a portion of an operation which is intended to reproduce is selectively collected and reproduced by selection by the identifier. Therefore, even in a web system which is used by a number of users, the scalability can be ensured. Further, selection of a portion of an operation which is intended to reproduce can be facilitated easily understandably by setting pertinent information to the identifier.

In the following, in FIG. 5, the flow of processings explained in reference to FIG. 3 and FIG. 4 is expressed by a sequence diagram, and an ID (Identifier) which becomes a candidate set as an identifier and a significance thereof are shown on the sequence diagram. Further, FIG. 6 shows an example of displaying a list of identifiers of the external reproducing device 181 and shows that selection of a portion of an operation which is intended to reproduce can easily be carried out understandably.

Figure 5:
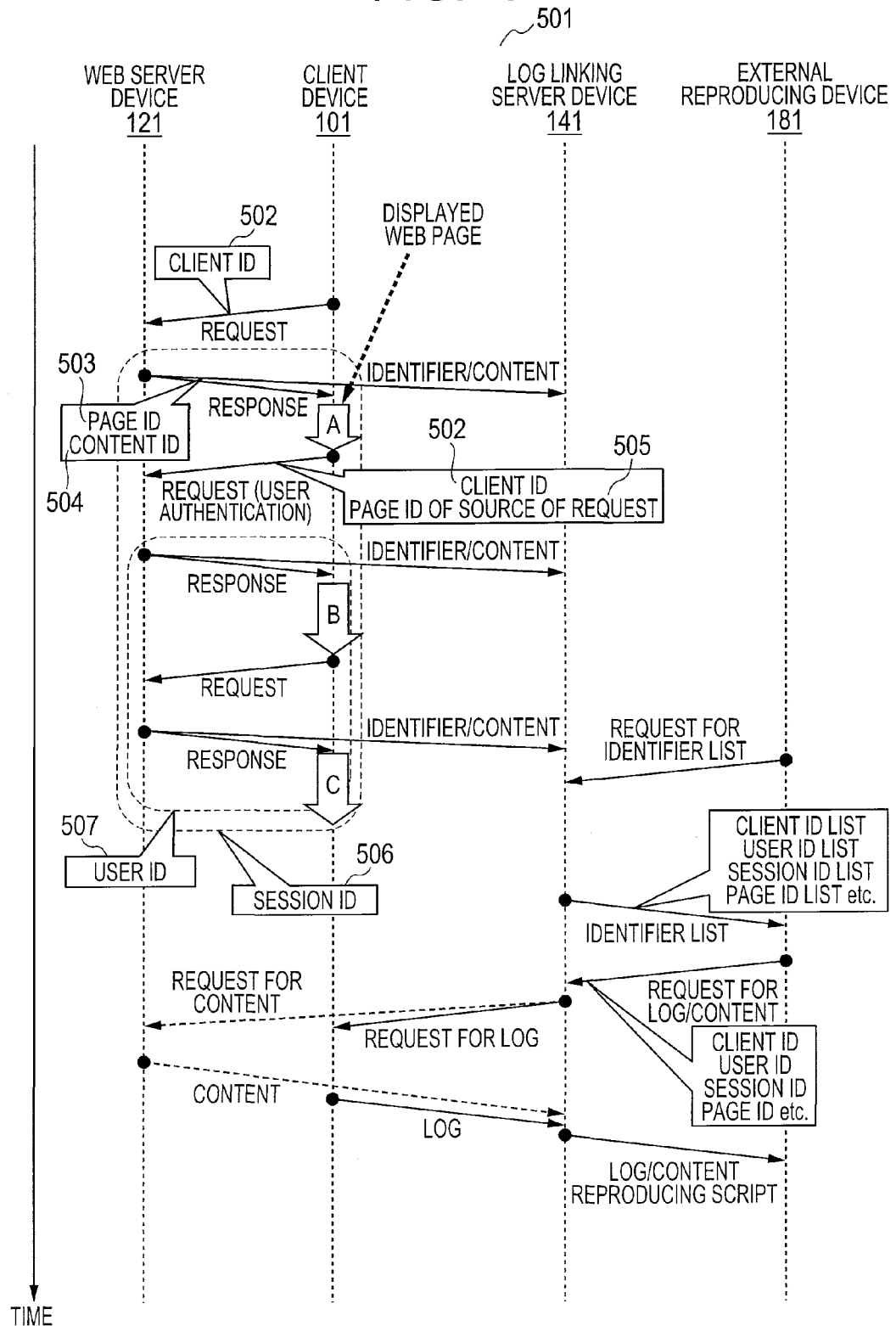
FIG. 5 is a diagram showing an identification related to a sequence of recording/reproducing an operation according to the first embodiment.

FIG. 5 is a diagram showing a sequence 501 of the flow of processings explained in reference to FIG. 3 and FIG. 4. Processings of forming, transmitting and receiving, and displaying a request and a response of a web page, and recording/reproducing an operation log are as explained in reference to FIG. 3 and FIG. 4. Here, a description will be given only of various kinds of ID's which become candidates set as identifiers, and other items which are not explained.

As candidates of identifiers, a client ID, a page ID, a content ID, a request source page ID, a session ID, a user ID and the like are pointed out.

Here, a client ID is an identifier which can specify the client device 101 issuing a request for a web page, and specifically, a network address or a machine name of the client device 101, a process number of a web browser, a hash value related thereto and the like are pointed out as examples. A client ID 502 can be formed and acquired by the client device 101, and therefore, the client ID 502 can be transmitted to the web server device 121 by being attached to a request.

Further, a page ID is an identifier which is formed by the web server device 121 and which is unique for each web page. Specifically, as an example, there is pointed out a value which is made by the web server device 121 by combining URL of a page, time of forming, a network address of the web server device 121 and the like. A page ID 503 is preferably other page ID in a case of a web page formed by other request even in the same URL.

A request source page ID is a page ID of a web page forming a request for a next web page in a case where a transition to the next web page occurs by a link or a button on the web page. A page transition state can be recorded by recording a set of a request source page ID 505 and a new page ID.

Although a content ID is an identifier similar to a page ID, whereas the page ID is an identifier provided by a unit of a web page, a content ID 504 is an identifier which is provided even to data of an image, a script code or the like without being limited to an HTML document of a web page. In a case of a static image without a change, even when the image is an image requested by other request, so far as the image stays the same, it is preferable to provide the same content ID to the static image. Thereby, when a content is preserved, with regard to a static content without a change, the same content ID is provided, and therefore, it is not necessary to duplicatedly preserve the content.

A session ID is an identifier ordinarily set by the web server device 121 for a transition of a series of web pages. In FIG. 5, web pages A, B, and C are a transition of a series of web pages, and therefore, a common session ID 506 is provided. For example, when one operation is completed by 3 pages of web pages A, B, and C, in a case where the operation is intended to reproduce by selecting a total of the operation of these, it is convenient to select an object of reproduction by a session ID 506.

A user ID is an identifier of specifying a user which carries out an operation of forming a request for a web page. Ordinarily, the user ID is an identifier which is inputted by a user, or set by a web server device or the like after authentication when authentication of a user is carried out. It is convenient to use a user ID 507 when the operation of the same user is intended to reproduce over time or location.

As is also known from FIG. 5, depending on an identifier, there is an identifier which is not present depending on a timing, and therefore, an identifier transmitted from the web server device 121 to the log linking server device 141 is varied depending on a timing, and there is also an identifier which can be calculated even when all of identifiers are not necessarily always transmitted.

When an object of reproducing an operation is selected between the external reproducing device 181 and the log linking server device 141, first, the log linking server device 141 transmits a list of preserved identifiers. The list includes all or a portion of candidates of identifiers described above, and a corresponding operation log and a corresponding content are specified by selecting the identifier from among the candidates by the external reproducing device 181.

FIG. 6 shows an example of displaying a list of identifiers displayed on a monitor of the external reproducing device 181, and an example of a selecting method. In FIG. 6, the client ID 502, the user ID 507, the session ID 506, the page ID 503, and time 604 are displayed. The time 604, is, for example, time of forming a web page designated by the page ID 503, or time at which a user designated by the user ID 507 carries out a user authentication. A pull-down menu written as "all" at a column 603 indicating a sum-up number or the like is a function of facilitating to select an object of reproduction by selecting and displaying only a necessary one of the identifiers. Further, a column 602 of "selection" displayed at a left end of a table of FIG. 6 is an interface designating an object of reproduction.

Also a method of providing operation ID's to operation logs formed at respective times of carrying out an operation on a web page respectively as identifiers in the client device 101, preserving the operation ID's to the log linking server device 141 similar to other identifiers, and enabling to select the operation ID's from the external reproducing apparatus 181 can be adopted as a modification of the present embodiment although the operation ID's are not described in FIG. 5 and FIG. 6.

Further, FIG. 6 is a diagram showing an example of displaying the list of identifiers of the external reproducing device 181, which is displayed based on the list of identifiers transmitted from the log linking server device 141 as described above. A storing portion of the local disk or the like of the log linking server device 141 is naturally accumulated and stored with such a list of identifiers although an illustration thereof is omitted.

An operation on the client device can continuously be recorded and the operation can selectively be reproduced by the flow of processings of the present embodiment described above in details. Further, the scalability can be ensured even in a web system which a number of users use.

Second Embodiment

An explanation will be given of a second embodiment in reference to FIG. 7 through FIG. 9, FIG. 15, and FIG. 16. Here, a description will be given only of a difference from the first embodiment, and the description will be omitted with regard to a portion explained in the first embodiment. The embodiment is an example of a method of recording/reproducing and a web system which can reproduce an operation of a web application correctly even when a cache is included in the web system.

Figure 7:
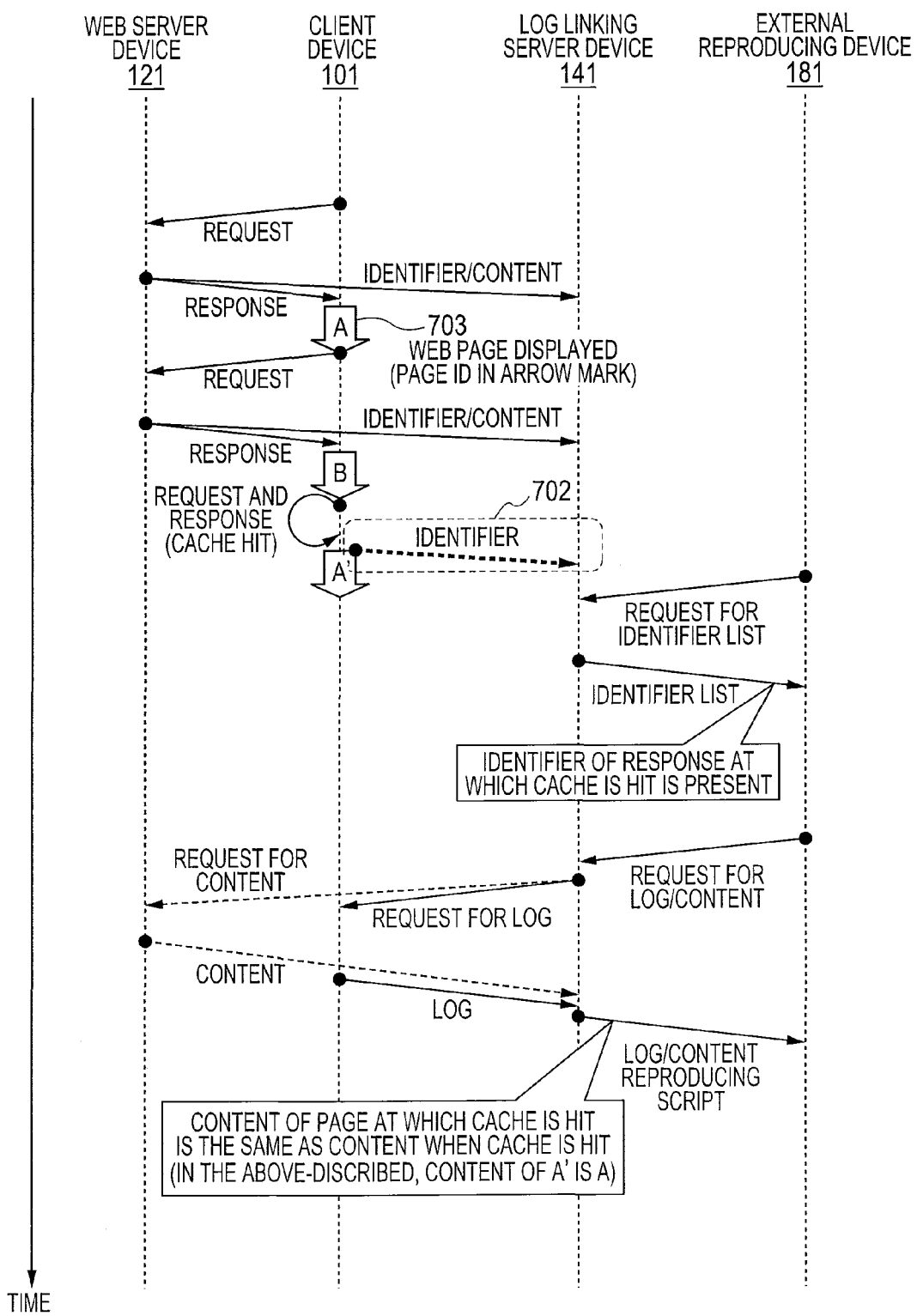
FIG. 7 is a diagram of a sequence of recording/reproducing scanning when a cache is hit according to a second embodiment.

FIG. 7 is a diagram showing a sequence 701 in a case where a requested web page is present in a cache region on the client device 101, and a display of the web page is completed on the client device without transmitting the request to the web server device 121 (hereinafter, in a case where a cache is hit).

FIG. 7 shows a case where a request is issued again to a web page 703 (page ID is A) which is received first from the web server device 121, although a content of the web page which is displayed by hitting a cache is the same as that of A, the web page is a web page displayed by other request, and therefore, page ID is determined as A'. As a method of detecting cache hit, there is a method of Japanese Patent Application No. 2008-232805 "Method of controlling to execute application, server computer and repeater device executing application" which has been filed previously by the applicant or the like. According to the method, on a web system consisted by a web server device and a client device, in order to differentiate whether a response of a content or the like received by the client device is formed by the web server device, or replied from a cache in the system, when the web server device forms a response of a content or the like, a cache hit detecting function of a program or the like for determining cache hit is added to the operation log acquiring function, and a determination of cache hit is made to be able to realize by executing the program by the client device receiving the response.

Although in the first embodiment, a transmission of the identifier to the log linking server device 141 is carried out by the web server device 121, and therefore, the list of identifiers on the log linking server device 141 is updated at a timing the same as that of forming a web page, in a case where a cache is hit, there poses a problem that an identifier of a web page at which a cache is hit is not included in the list of identifiers on the log linking server device 141.

In the second embodiment, the above-described problem is resolved by adding a cache hit detecting function in accordance with a method of detecting a cache hit disclosed in the previous application by the applicant, mentioned above, a function of updating an identifier when cache hit is detected, and a function of transmitting the updated identifier to the log linking server device 141 (702) to the operation log acquiring function executed by the client device 101.

Figure 8:
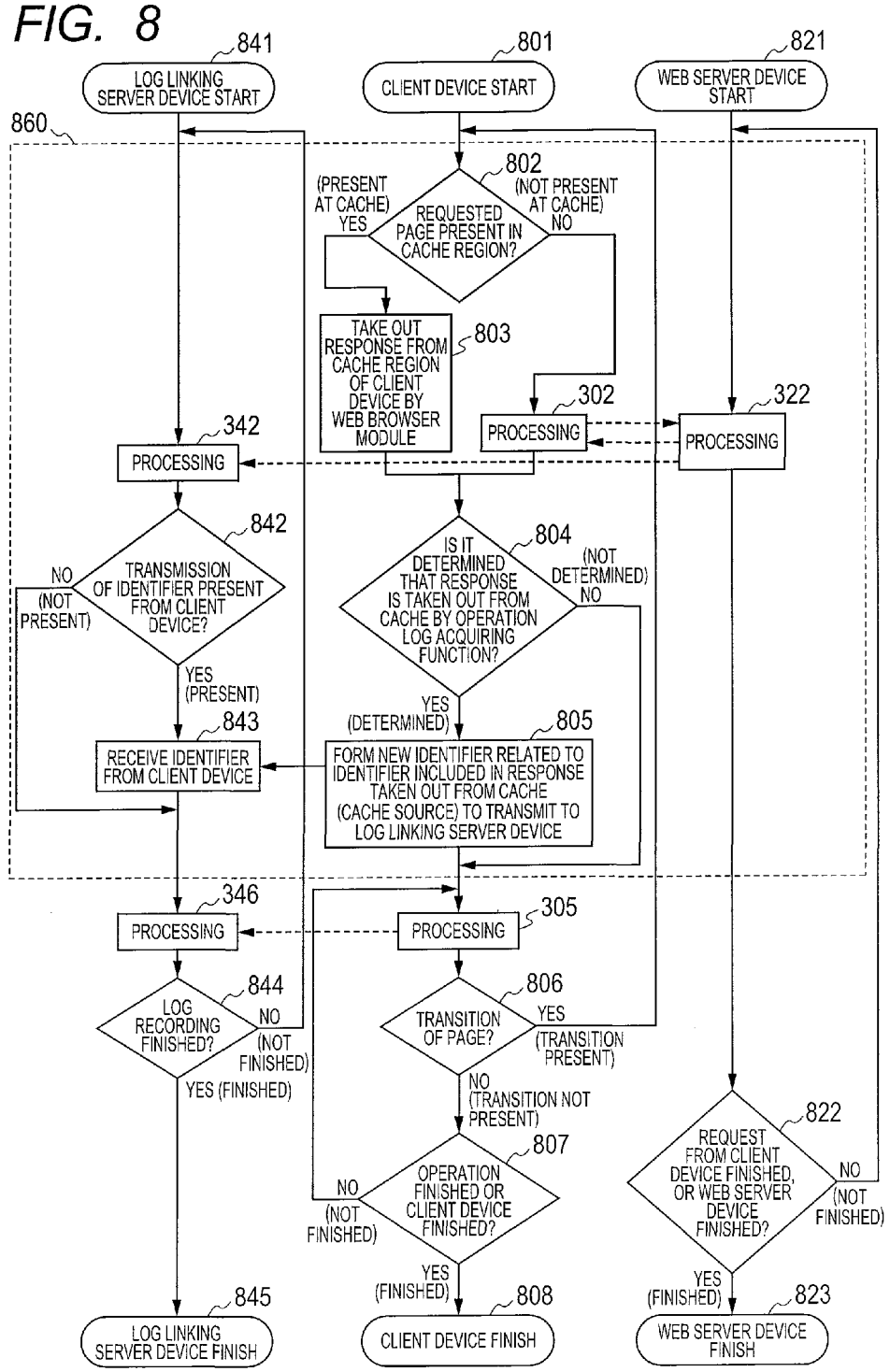
FIG. 8 is a diagram showing a flow of processing to record an operation according to the second embodiment.

FIG. 8 is a diagram showing a flow of processings of a method of recording an operation of a web application attached with a cache hit detecting function. First, at client device start 801, in the client device 101, it is determined whether a requested page is present at the cache region (step 802), when the page is present at the cache, the response is taken out from the cache region and is displayed (step 803).

At this occasion, as described above, an identifier is not transmitted to the log linking server device 141. Next, it is determined whether the response of the web page has been taken out from the cache by the cache hit detecting function added to the operation log acquiring function, that is, the program for determining cache hit (step 804), and in a case of cache hit, the identifier is updated, and the updated identifier is transmitted to the log linking server device (step 805, corresponding to transmission 702 of FIG. 7).

According to the present embodiment, an identifier is updated by the following method. A response which is taken out by hitting a cache includes an identifier which has been inserted when the web page is formed by the web server device 121. Here, the identifier is referred to as a first identifier. Further, an identifier as updated is referred to as a second identifier. In updating the identifier, it is preferable that the first identifier and the second identifier are related to each other, and it is known that the second identifier is an identifier which has been updated when a cache is hit. For example, as in designating the first identifier by notation A, and designating the second identifier by notation A', it is made to be known that the original identifier of the web page is designated by notation A. This is because when a cache is hit, a content of the web page stays common, and therefore, in a case where when the original content of the page is acquired, and thereafter, a state of an operation on the web page at which a cache is hit is reproduced, the original identifier of the page can be calculated from the identifier as updated, there is an advantage that the original content of the web page can easily be acquired.

At the log linking server device 141, it is determined whether the identifier is transmitted from the client device 101 (step 842), and a processing of receiving the identifier also from the client device 101 and preserving the identifier similar to an identifier received from the web server device 121 (step 843) is added.

Further, it is acceptable to carry out a processing of always transmitting an identifier from the client device 101 to the log linking server device 141 without depending on presence or absence of cache hit by omitting step 804. However, in this case, in a case where a cache is hit, the original identifier of the page is transmitted to the log linking server device 141, and therefore, it is necessary to update the identifier at the log linking server device 141. Specifically, there is pointed out an example of a method of browsing a list of identifiers preserved on the log linking server device 141, investigating presence or absence of a page ID coinciding with a page ID included in an identifier transmitted from the client device 101, determining as cache hit when the page ID is present, updating the identifier, and thereafter, adding the identifier to the list of identifiers. Also in updating the identifier in this case, similar to the above-described, it is preferable to calculate an identifier before updating from an identifier after updating by a calculation. A flow of processing of the method of recording an operation described above is summarizingly referred to as step 860 in the following.

Figure 9:
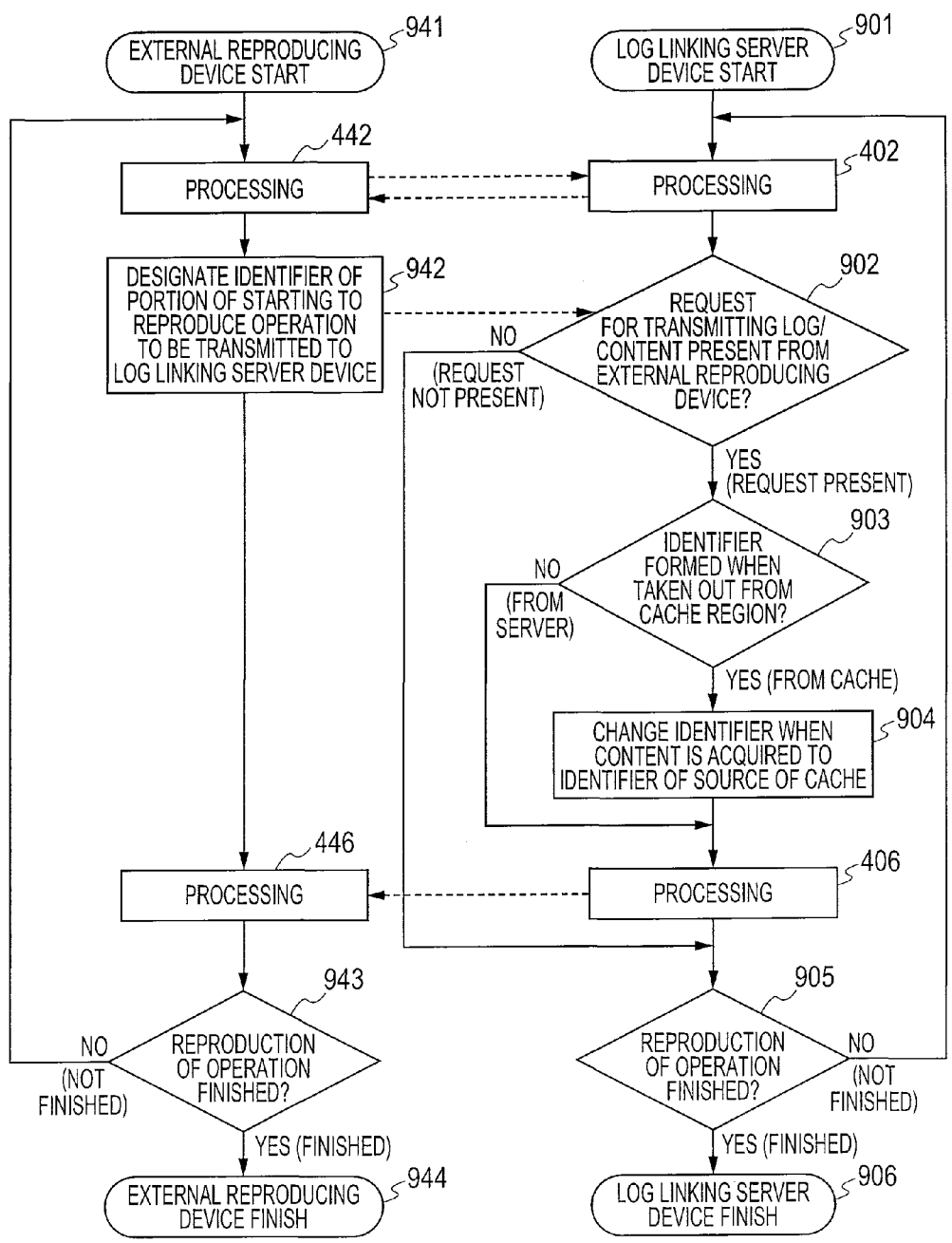
FIG. 9 is a diagram showing a flow of processing to reproduce an operation according to the second embodiment.

FIG. 9 is a diagram showing a flow of processing a method of reproducing an operation of a web application according to the present embodiment. In the log linking server device 141, at log linking server device start 901, after a processing 402, it is determined whether an identifier designated from the external reproducing device 181 is an identifier formed when the identifier is taken out from a cache region (step 903). In a case of cache hit, the identifier (second identifier described above) is converted into an original identifier (first identifier described above) (step 904) and a content corresponding to the identifier as converted is transmitted to the external reproducing apparatus 181. Further, with regard to an operation log, an operation log corresponding to an identifier before conversion is transmitted. When a cache is hit, although a content of a web page is not preserved at the log linking server device 141, an original content of a web page of a source of a cache is made to be able to be acquired, and a reproduction of a state of an operation on the web page at which a cache is hit can be realized.

Figure 15:
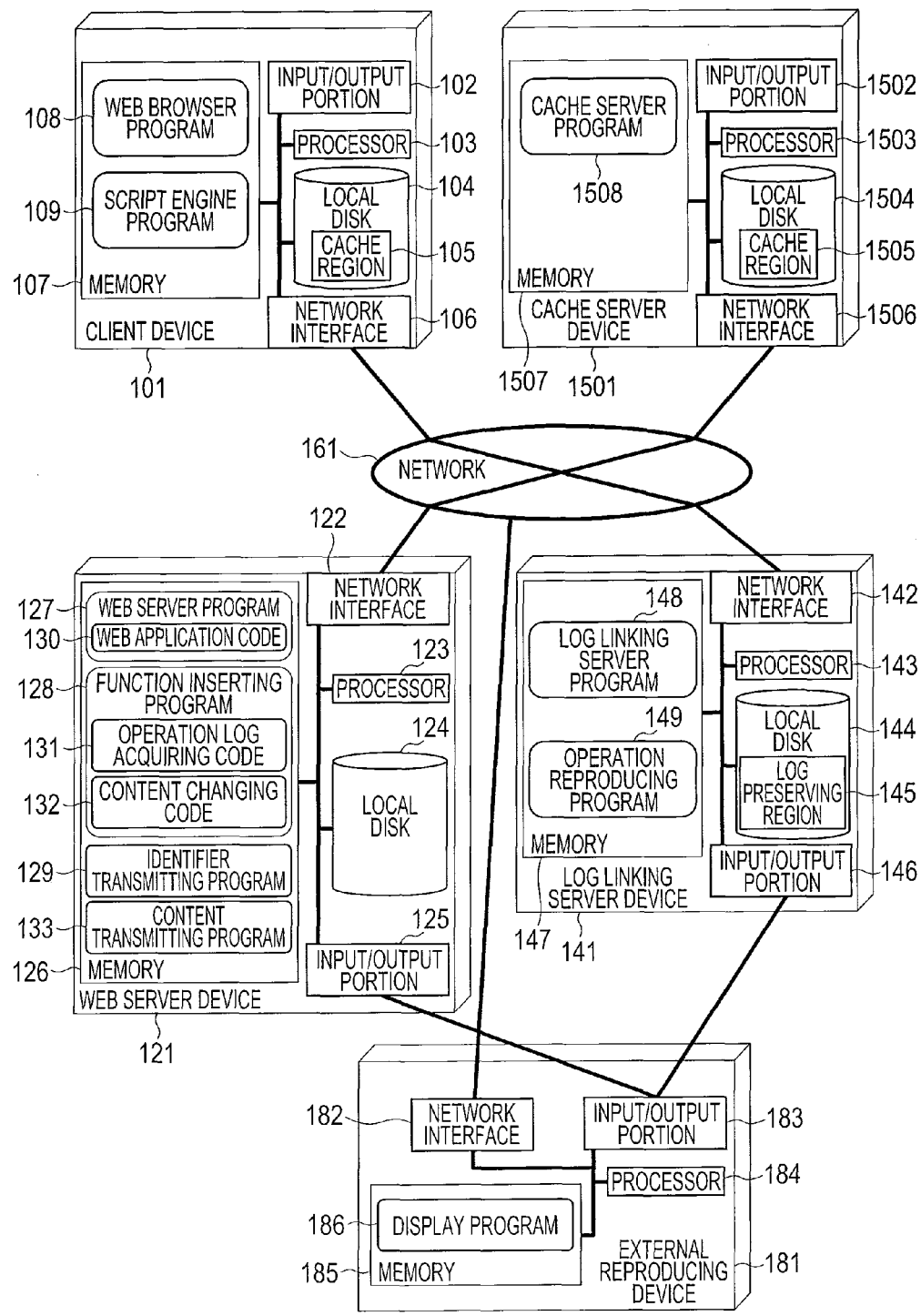
FIG. 15 is other system constitution diagram of executing a web application according to the respective embodiments.

FIG. 15 is a diagram showing other system constitution constituting an object by the embodiment described above. A difference from the system constitution of FIG. 1 resides in that there is a cache server device 1501 on a network. The cache server device 1501 is constituted by a processor 1503, a local disk 1504, an input/output portion 1502, a network interface 1506, a memory 1507 and the like, and is connected to the network 161 similar to the web server device 121 or the like. A cache server program 1508 is stored on the memory 1507 and is executed on the processor 1503. There is a cache region 1505 at the local disk 1504 which is used for the cache server program 1508 to temporarily preserve a content of a web page or the like.

Figure 16:
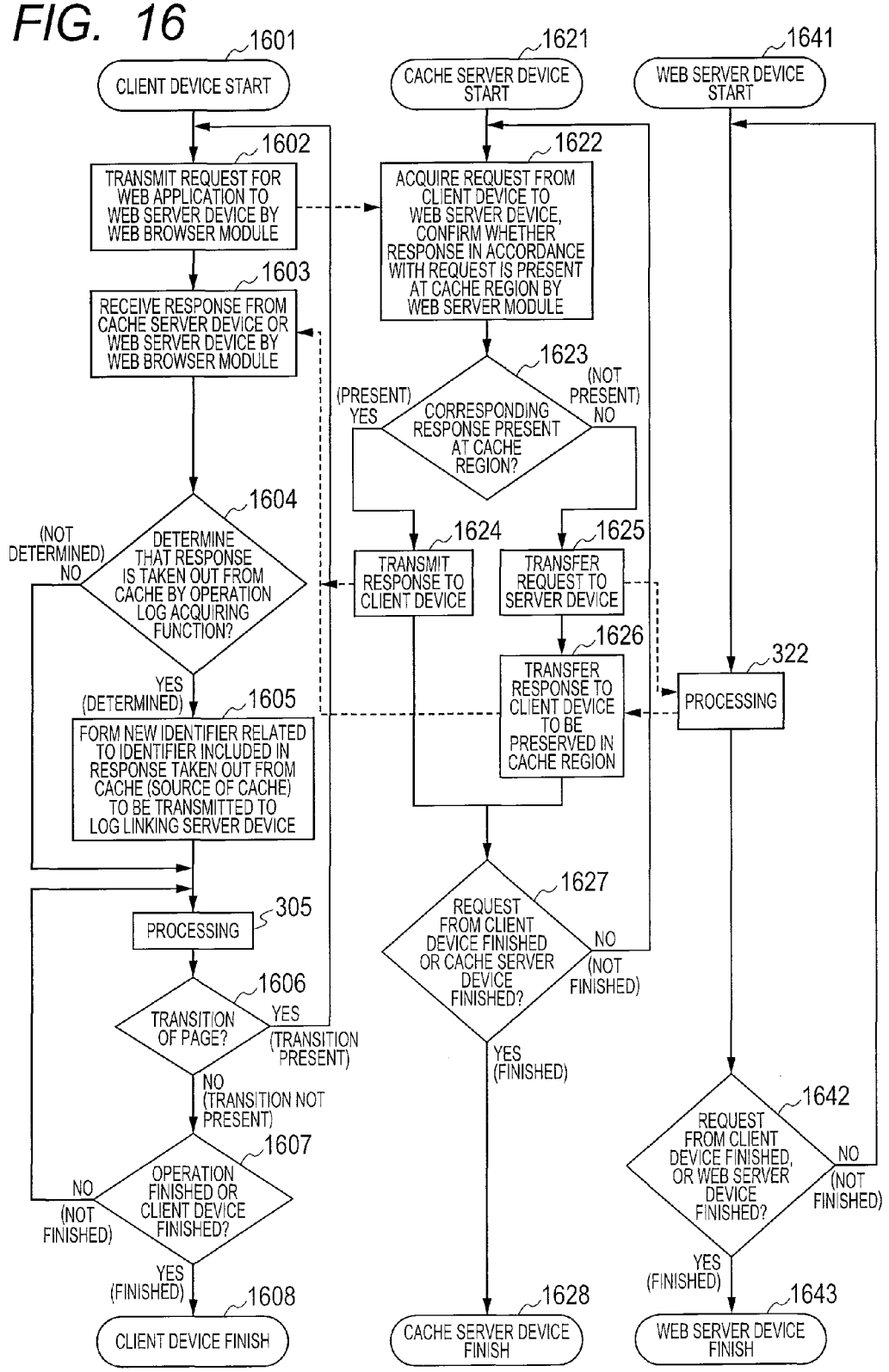
FIG. 16 is a diagram showing a flow of processing to record an operation in the other system constitution shown in FIG. 15.

FIG. 16 is a diagram showing a flow of processing a method of recording an operation of a web application in the system constitution shown in FIG. 15. Here, an explanation will be given only of a difference from FIG. 8. Further, although in FIG. 16, a flow of processing with regard to the log linking server device 141 described in FIG. 8 is omitted in FIG. 16, the flow of processing is the same as that of FIG. 8.

By cache server device start 1621, the cache server device 1501 acquires a request from the client device 101 to the web server device 121 before arrival at the web server device 121, determines whether a corresponding response is present at a cache region (step 1622), when there is a corresponding response, the cache server device 1501 transmits the corresponding response to the client device 101 (step 1624), when there is not the corresponding response, the cache server device 1501 transfers the request to the web server device 121 (step 1625), and preserves a response from the web server device 121 at the cache region while transferring the response from the web server device 121 to the client device 101 (step 1626).

On the other hand, the client device 101 carries out a processing by determining also a response received from the cache server device 1501 as cache hit. A method of reproducing an operation in the system constitution of FIG. 15 is the same as those of FIG. 8 and FIG. 9, and therefore, here, an explanation thereof will be omitted.

By the flow of processing of the second embodiment explained above, recording/reproducing of an operation can correctly be realized even when a cache is hit at the client device or the cache server device.

Third Embodiment

An explanation will be given of a third embodiment in a method of reproducing an operation of a web application when a cache is hit in reference to FIG. 10. Here, a description will be given only of a difference from the second embodiment, and an explanation will be omitted with regard to a portion explained in the second embodiment.

Figure 10:
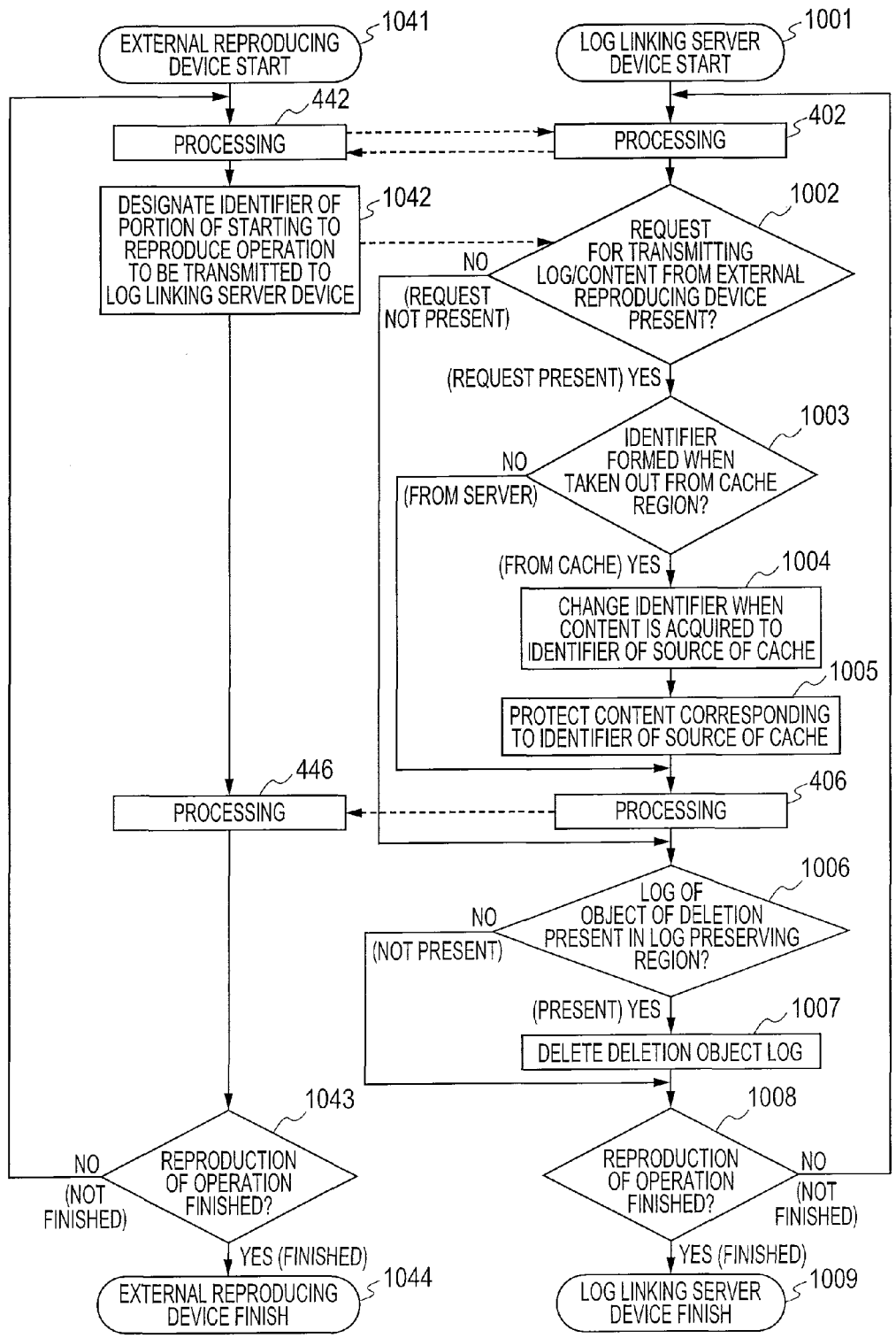
FIG. 10 is a diagram showing other flow of processing to reproduce an operation according to a third embodiment.

FIG. 10 is a diagram showing a flow of processing a method of reproducing an operation of a web application. As described in the explanation of FIG. 9, when a cache is hit, it is necessary to acquire an original content of a cache. However, time at which the original content of the cache is preserved on the log linking server device 141 is prior to time at which a request for a web page when a cache is hit is generated. At the log linking server device 141, although an identifier or a content, an operation log or the like is preserved in the log preserving region, it is conceivable to delete a portion of data (steps 1006, 1007) or move a portion of data to other storing region in view of a restriction on a capacity of a log preserving region or the like. In such a case, ordinarily, an object thereof is frequently constituted from old data. Then, there poses a problem that an original content of a cache is not present in the log preserving region, and a reproduction of an operation cannot correctly be carried out.

Hence, according to the present embodiment, a resolution of the problem is achieved by protecting a content constituting an object of being transmitted to the external reproducing device 181 as an original content of a cache by making the content difficult to be deleted, or moved or the like (step 1005). Specifically, at step 1005 of protecting the content by preventing the content from being deleted or moved or the like, or making the content difficult to be deleted, or moved or the like, there is pointed out an example of a method of making a priority order of constituting an object of deleting a preserved content, lowering a priority order of a content constituting an object of protection, attaching a marker of prohibiting deletion/movement which is effective for a constant period of time to the content, recording time of being used finally to the respective contents, and constituting an object of deletion in an older order of the time or the like.

By a flow of processing of a third embodiment described above, a possibility of capable of correctly realizing a reproduction of an operation even when a cache is hit can be enhanced.

Fourth Embodiment

An explanation will be given of other embodiment with regard to a processing a method of reproducing an operation of a web application in reference to FIG. 11. Here, a description will be given only of a difference from the second embodiment and the description will be omitted with regard to a portion explained in the second embodiment.

Figure 11:
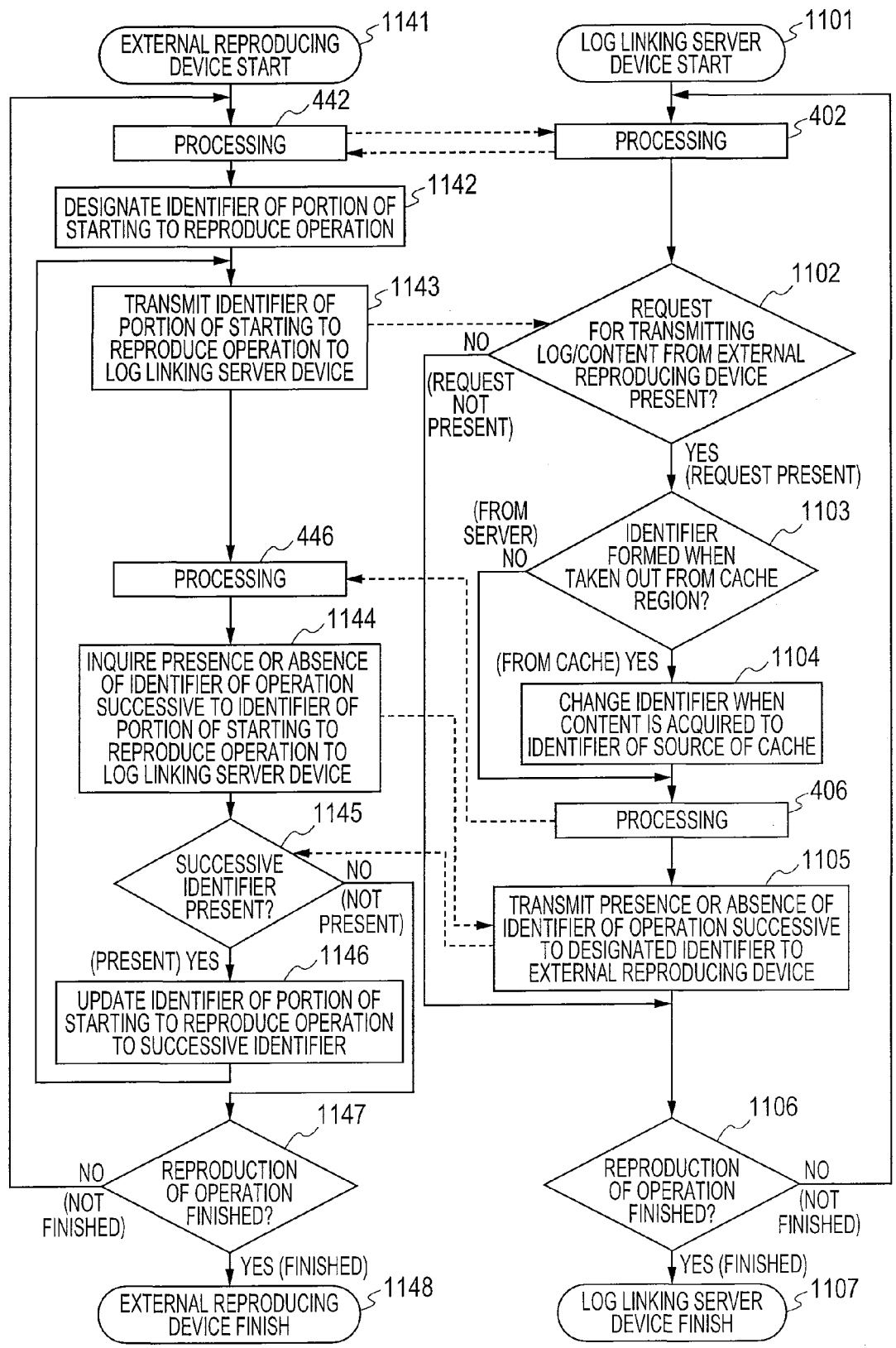
FIG. 11 is a diagram showing a flow of processing to reproduce an operation according to a fourth embodiment.

FIG. 11 is a diagram showing a flow of processing a method of reproducing an operation of a web application. Although in the external reproducing device 181 of the second embodiment, after executing a reproduction of an operation, a designation of a next object of reproduction is awaited, in a case where an operation is reproduced simultaneously in parallel with an operation of a user, when the operation of the user can be reproduced automatically, an availability of reproducing the operation is promoted.

In FIG. 11, after the external reproducing device 181 executes a reproduction of an operation (step 446), the external reproducing device 181 inquires whether an identifier successive to an identifier of a portion of reproducing the operation is present in the log linking server device 141 (step 1144), when the successive identifier is present, the external reproducing device 181 updates an identifier of an object of a reproduction to the successive identifier (step 1146), and automatically reproduces the operation (step 1143). At the log linking server device 141, a processing of determining presence or absence of the identifier successive to the identifier designated from the external reproducing device 181 (step 1105) is added.

Here, the successive identifier is, for example, a page ID in a relationship between an original page ID of a request and the page ID. That is, in a case where a page ID of a reproduced web page is designated by notation A, when an identifier of a web page having a page ID designated by notation B in which an original page ID of a request is designated by notation A is present at the log linking server device 141, as the successive identifier, an identifier of the web page having the page ID designated by notation B is transmitted to the external reproducing device 141, and the external reproducing device 141 designates the identifier, and executes a reproduction by acquiring an operation log or a content of an object of the reproduction. Although here, an explanation has been given of presence or absence of the successive identifier by constituting a unit by a web page, it is one mode of the present embodiment to automatically reproduce the successive operation on the same web page by determining presence or absence of a successive operation ID by constituting a unit by an operation.

By the flow of processing of the fourth embodiment explained above, the reproduction of the operation can be realized simultaneously in parallel with the operation of a user, and an availability of reproducing the operation is promoted.

Fifth Embodiment

Successively, an explanation will be given of other embodiment of a method of recording an operation of a web application as a fifth embodiment in reference to FIG. 12. Here, a description will be given only of a difference from the second embodiment, and the description will be omitted with regard to a portion explained in the second embodiment.

Figure 12:
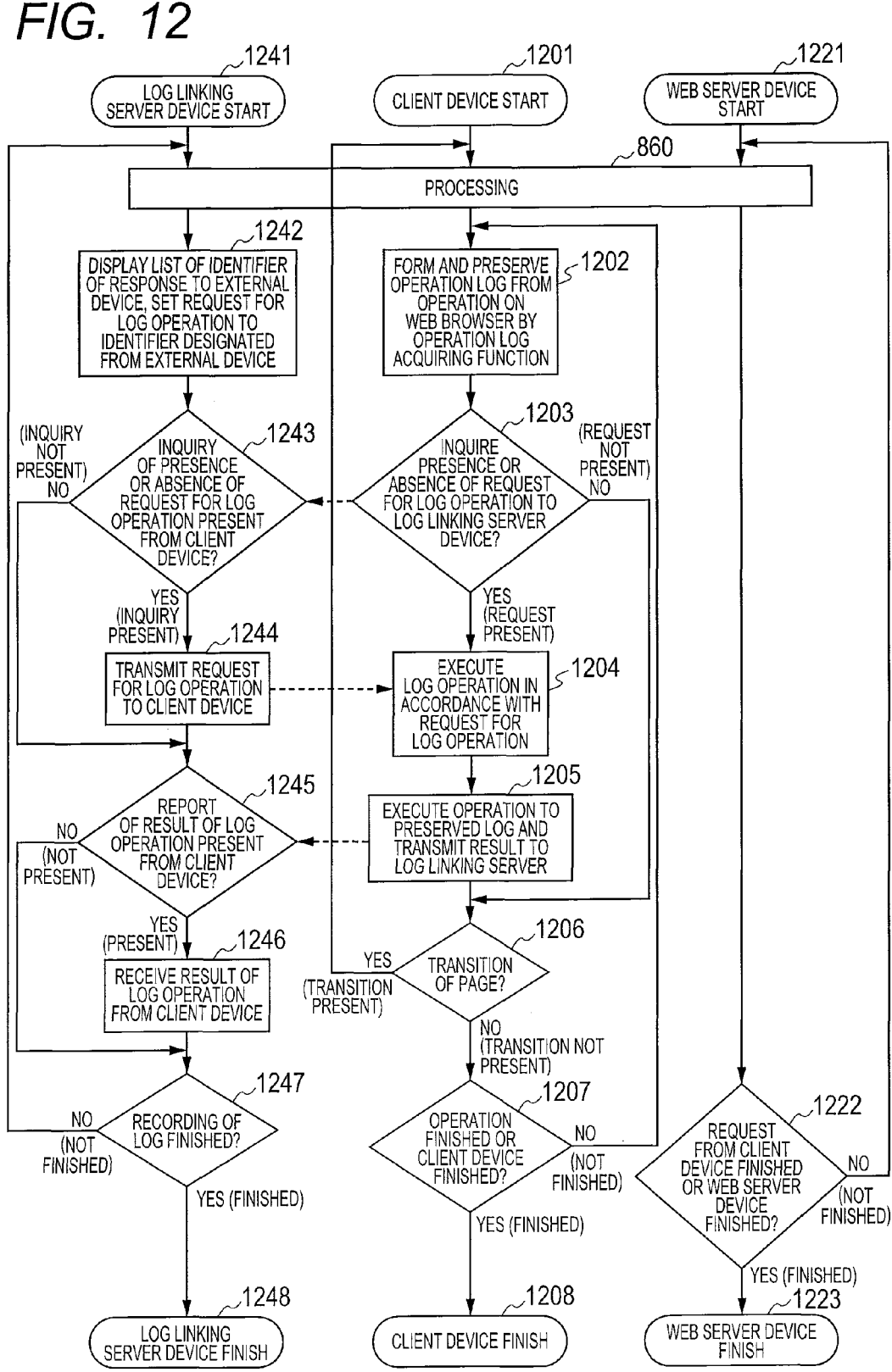
FIG. 12 is a diagram showing a flow of processing to record an operation according to a fifth embodiment.

FIG. 12 is a diagram showing a flow of processing a method of recording an operation of a web application. Although in the second embodiment, at the log linking server device 141, only a processing of transmitting an operation log from the client device 101 is shown, in the present embodiment, information necessary for reproducing an operation can be provided, or an information processing of using an operation log can be realized by deleting an operation log on the client device 101, transmitting only an operation log satisfying a condition, or transmitting a result of carrying out a statistical processing for an operation log on the client device 101.

In FIG. 12, a command of a log operation as described above is prepared for a designated identifier from an external device of the external reproducing device 181 or the like (step 1242), the prepared command is transmitted to an inquiry from the client device (steps 1243, 1244), and a result of the log operation in accordance with the command is received from the client device (steps 1245, 1246).

At the client device 101, the log operation is executed in accordance with the command received from the log linking server device 141 (step 1204), and a result thereof is transmitted to the log linking server device (step 1205).

By the flow of processing described above, a complicated processing for an operation log can be executed on the client device 101, and a range of using an operation log can be enlarged.

Sixth Embodiment

An explanation will be given of other embodiment with regard to a method of recording an operation of a web application in reference to FIG. 13 and FIG. 14. Here, a description will be given only of a difference from the second embodiment, and the description will be omitted with regard to a portion explained in the second embodiment.

Figure 13:
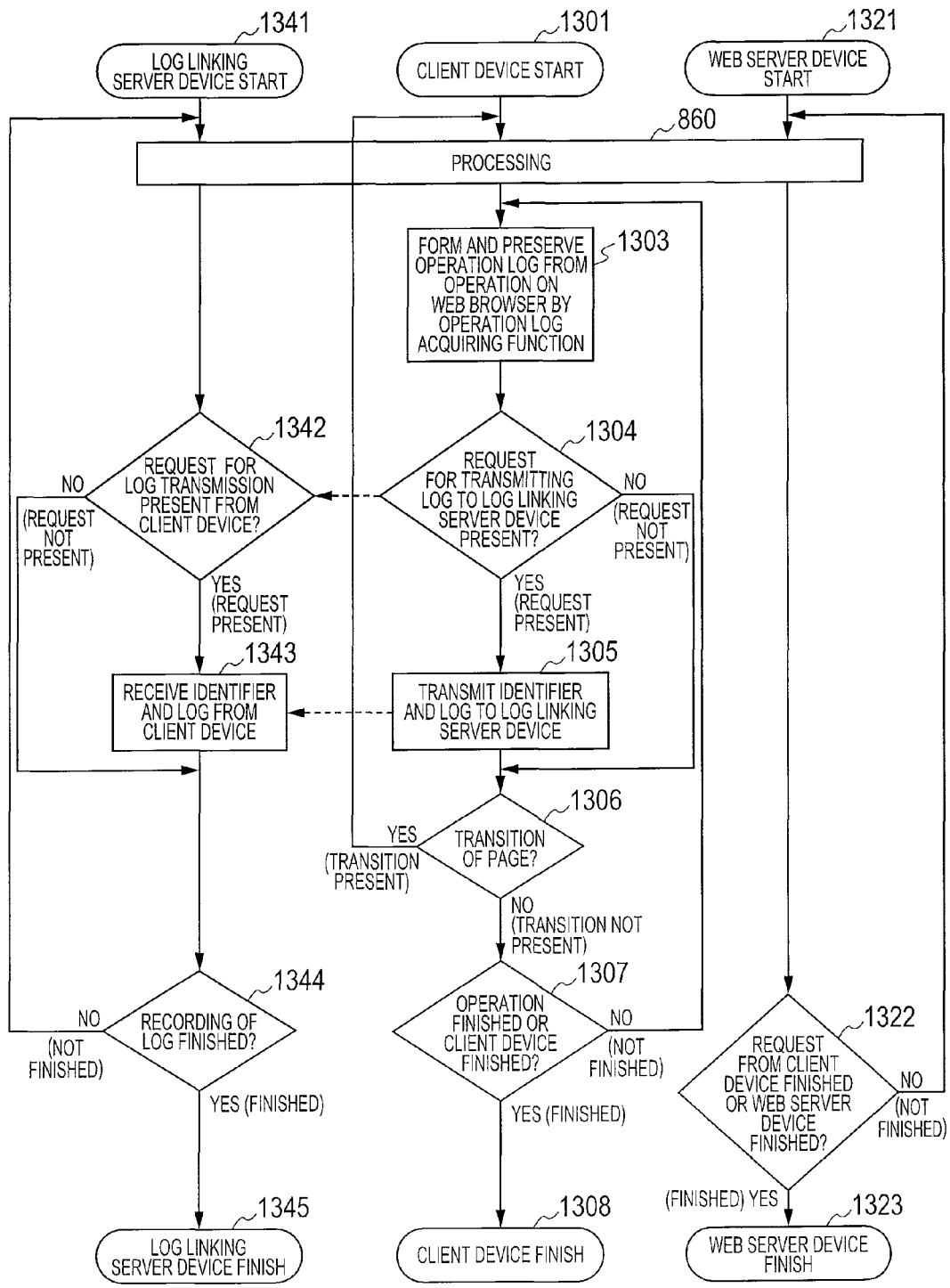
FIG. 13 is a diagram showing a flow of processing to record an operation according to a sixth embodiment.

FIG. 13 is a diagram showing a flow of processing a method of recording an operation of a web application. In FIG. 13, at the client device 101, a function of issuing a request for transmitting a log to the log linking server device 141 is included in the operation log acquiring function (steps 1304, 1305), and at the log linking server device 141, a processing of receiving an operation log by receiving a request for transmitting the log from the client device 101 (steps 1342, 1343) is added.

Figure 14:
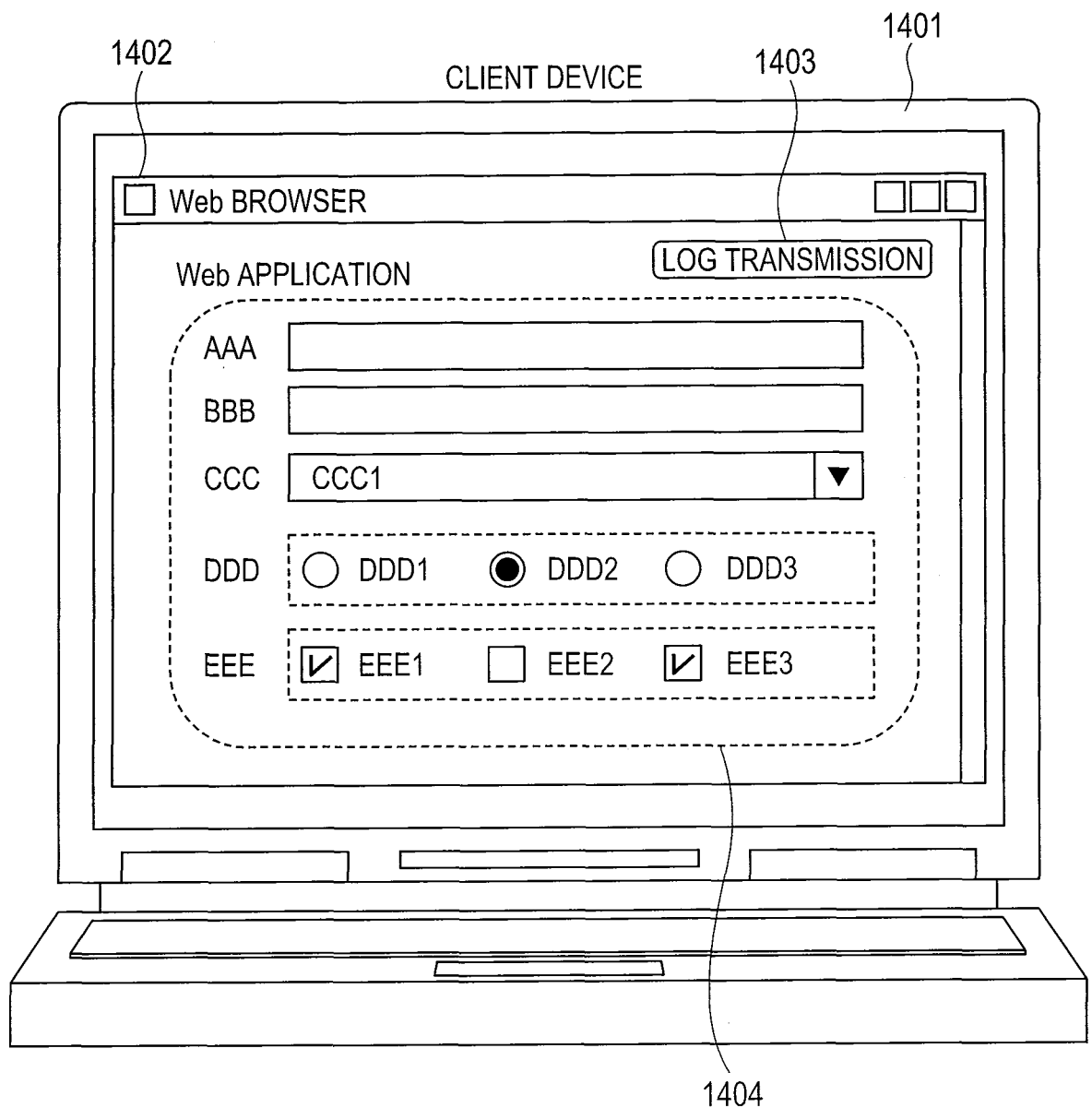
FIG. 14 is a diagram showing an example of a display screen of a screen of transmitting an operation log according to the sixth embodiment.

FIG. 14 is a diagram showing an example of a screen of transmitting an operation log at the client device 101 according to the present embodiment. In FIG. 14, the operation log acquiring function adds a log transmitting button 1403 on a web page, and when the button is pressed down, a request for transmitting a log is transmitted to the log linking server device 141. As other method, there is also a method of transmitting a request for transmitting a log in accordance with a state of inputting or a state of selecting an input form or a pull-down menu, a check box, a radio button or the like (1404).

By the above-described flow of processing, a transmission of a log from a side of the client device 101 to the log linking server device 141 is realized, an object of reproducing an operation can be designated from a side of a client, and an availability of reproducing an operation is promoted.

Although an explanation has been given by exemplifying the first through the sixth embodiments as described above, also an arbitrary selective combination of the first through the sixth embodiments becomes other embodiments.

Further, the first through the sixth embodiments respectively show only examples. For example, a deletion of an unnecessary operation log from above the client device while reproducing the operation is realized by a combination of the embodiments of the present invention. Further, as information having a possibility of being included in an operation log, all of information which can be recorded on a web browser becomes an object. Further, although an explanation has been given only of a case in which all of the devices are constituted by single pieces, as described above, the present invention includes also a case in which all the devices are respectively constituted by plural ones thereof, or the plural devices are summarized by a small number of pieces. Further, a client may execute a portion or a total of processings at respective servers described above.

The present invention is extremely useful as a method of processing and an apparatus of processing to record and reproduce an operation of a web application.

What is claimed is:

1. A method of recording/reproducing an operation of a web application which is a method of recording/reproducing an operation of a web application in a web system including a web server of executing the web application, a web browser of displaying a web page, and a network of coupling the web server and the web browser to each other, the web system having a log linking server of preserving an operation log on the web page, the method comprising:

when the web page is transmitted to the web browser, the web server transmitting an identifier related to the web page to the log linking server, and inserting an operation log acquiring function operated by the web browser and at least a portion of the identifier to the web page to be transmitted to the web browser;

the web browser transmitting a request for the web page to the web server, executing the operation log acquiring function inserted to the web page received, forming an operation log on the web page, and preserving the operation log by relating the operation log to the identifier;

the log linking server preserving the identifier transmitted from the web server, selecting a specific identifier from the identifier transmitted from the web server, transmitting a request for the operation log of the web page related to the specific identifier, and receiving the operation log from the web browser; and the operation log acquiring function executed on the web browser inquiring presence or absence of the request for the log operation to the log linking server, and when there is the request, the operation log acquiring function carrying out an operation in accordance with the request, thereafter, transmits a result of the operation to the log linking server;

the web system further including an external reproducing portion capable of being connected to the log linking server, the method further comprising:

the external reproducing portion displaying a table of the identifiers preserved in the log linking server, selecting a specific identifier from the identifiers displayed in the table, transmitting the specific identifier to the log linking server, acquiring a content of the web page related to the selected identifier, and the operation log on the web page, and outputting a content of an operation in accordance with the operation log;

when the web page formed by the web server is transmitted to the web browser, the log linking server receiving the content of the web page in addition to the identifier related to the web page, and preserving the content by being related to the identifier related to the web page;

the external reproducing portion receiving the content of the web page related to the selected identifier and the operation log from the log linking server;

the web browser transmitting the identifier inserted to the web page by the operation log acquiring function executed on the web browser to the log linking server; and the log linking server receiving the identifier from the web browser, and preserves the identifier along with the identifier received from the web server;

the web system further including a cache temporarily preserving the content of the web page, and transmitting the content to the web browser, when the content of the web page corresponding to the request from the web browser is temporarily preserved, the method further comprising:

when the web browser receives the web page from the cache, the web browser designating the identifier related to the web page received from the cache as a first identifier, converting the first identifier into a second identifier uniquely related to the first identifier, and transmitting the second identifier as the identifier to the log linking server; and when the log linking server receives a request for transmitting the content of the web page of the identifier designated from the external reproducing portion, in a case where the designated identifier is the second identifier, the log linking server converting the second identifier into the first identifier, and transmitting the content of the web page related to the first identifier to the external reproducing portion.

2. The method of recording/reproducing an operation of a web application according to claim 1, wherein as the identifier, any one or more of a page ID having a unique value at each request for the web page, a page ID of a source of the request, a client ID capable of specifying a source of transmitting the request for the web page, a user ID capable of specifying a user requesting for the web page, a session ID provided to the request for a series of the continuous web pages, and an operation ID having a unique value at each operation on the web page is (are) included.

3. The method of recording/reproducing an operation of a web application according to claim 1, the method further comprising:

the log linking server determining the identifier designated from the external reproducing portion as the second identifier, converting the second identifier into the first identifier, and protecting the content transmitted to the external reproducing portion as the content of the web page related to the first identifier.

4. The method of recording/reproducing an operation of a web application according to claim 1, the method further comprising:

the external reproducing portion inquiring presence or absence of the operation log successive to the operation log received from the log linking server, or the identifier related to the web page successive to the displayed web page to the log linking server, and receiving the successive operation log or the content of the successive web page from the log linking server as the operation executed on the displayed web page.

5. The method of recording/reproducing an operation of a web application according to claim 1, the method further comprising:

the operation log acquiring function executed on the web browser transmitting the request for transmitting the operation log under a constant condition, and transmitting the operation log to the log linking server at a pertinent timing; and the log linking server determining presence or absences of the request for transmitting the log from the web browser, and when there is the request for transmitting the log, the log linking server receiving and preserves the operation log at a pertinent timing.

6. A web system which is a web system comprising a web server executing a web application at a processing portion, and a network coupling a client executing a web browser of displaying a web page to the web server, the web system further including a log linking server having a processing portion and a storing portion of preserving an operation log on the web page;
  wherein the processing portion of the web server transmits an identifier related to the web page to the log linking server when the processing portion transmits the web page to the client, inserts an operation acquiring function operated by the web browser and at least a portion of the identifier related to the web page to the web page to be transmitted to the client;
  wherein the processing portion of the log linking server preserves the identifier transmitted from the web server, selects a specific identifier from the identifier transmitted from the web server, and issues a request for transmitting an operation log of the web page related to the specific identifier, and the client executes the operation log acquiring function inserted to the web page to form, and receives the operation log related to the identifier; and
  the operation log acquiring function executed on the web browser inquiring presence or absence of the request for the log operation to the log linking server, and when there is the request, the operation log acquiring function carrying out an operation in accordance with the request, thereafter, transmits a result of the operation to the log linking server;
  the web system further including an external reproducing portion capable of being connected to the log linking server,
  the external reproducing portion displaying a table of the identifiers preserved in the log linking server, wherein a specific identifier is selected from the identifiers displayed in the table, the specific identifier is transmitted to the log linking server, a content of the web page related to the selected identifier and the operation log on the web page are acquired, and a content of an operation is outputted in accordance with the operation log;
  when the web page formed by the web server is transmitted to the web browser, the log linking server receives the content of the web page in addition to the identifier related to the web page, and the content is preserved by being related to the identifier related to the web page;
  the external reproducing portion receives the content of the web page related to the selected identifier and the operation log from the log linking server;
  the web browser transmits the identifier inserted to the web page by the operation log acquiring function executed on the web browser to the log linking server; and
  the log linking server receives the identifier from the web browser, and preserves the identifier along with the identifier received from the web server;
  the web system further including a cache temporarily preserving the content of the web page, and transmitting the content to the web browser, when the content of the web page corresponding to the request from the web browser is temporarily preserved;
  when the web browser receives the web page from the cache, the web browser designates the identifier related to the web page received from the cache as a first identifier, converts the first identifier into a second identifier uniquely related to the first identifier, and transmits the second identifier as the identifier to the log linking server; and
  when the log linking server receives a request for transmitting the content of the web page of the identifier designated from the external reproducing portion, in a case where the designated identifier is the second identifier, the log linking server converts the second identifier into the first identifier, and transmits the content of the web page related to the first identifier to the external reproducing portion.

7. The web system according to claim 6, wherein as the identifier, any one or more of a page ID having a unique value at each request for the web page, a page ID of a source of the request, a client ID capable of specifying a source of transmitting the request for the web page, a user ID capable of specifying a user requesting for the web page, a session ID provided to the request for a series of the continuous web pages, and an operation ID having a unique value at each operation on the web page is (are) included.

8. The web system according to claim 7, further comprising:
  an external reproducing device connected to the log linking server,
  wherein the external reproducing device includes an interface portion of displaying a table of the identifiers preserved in the storing portion of the log linking server, and selecting a specific identifier from the identifiers displayed in the table, transmitting the selected identifier to the log linking server, acquiring a content of the web page related to the selected identifier, and the operation log on the web page, and displaying a content of an operation in accordance with the operation log.

9. The web system according to claim 6, further comprising:
  a cache function of temporarily preserving a content of the web page, and transmitting the content to the client, when the content of the web page corresponding to a request from the client is temporarily preserved; and
  wherein when the client receives the web page from the cache function, the client determines the identifier related to the received web page as a first identifier, converts the identifier into a second identifier uniquely related to the first identifier, and transmits the second identifier to the log linking server as the identifier, and when the processing portion of the log linking server receives a request for transmitting a content of the web page of the identifier designated from the external reproducing device, in a case where the designated identifier is the second identifier, the processing portion converts the identifier from the second identifier to the first identifier, and transmits the content of the web page related to the converted first identifier.

10. A web system in which a web server of executing a web application at a processing portion, and a client of executing a web browser of displaying a web page at a processing portion are coupled to each other, the web system further comprising:
  a log linking server having a processing portion and a storing portion; and
  a reproducing portion connected to the log linking server;
  wherein when the processing portion of the web server transmits the formed web page to the client, the processing portion transmits an operation acquiring function operated by the web browser and an identifier related to the web page to the client, and transmits the identifier related to the web page to the log linking server;
  wherein the processing portion of the client executes the operation log acquiring function received from the web server, forms an operation log on the web page, and preserves the operation log by relating the operation log to the identifier;

wherein the processing portion of the log linking server stores the received identifier to the storing portion;

wherein the reproducing portion selects a specific identifier in the identifier stored to the storing portion of the log linking server and transmits the specific identifier to the log linking server, and acquires and reproduces a content of the web page related to the specific identifier, and the operation log on the web page; and the operation log acquiring function executed on the web browser inquiring presence or absence of the request for the log operation to the log linking server, and when there is the request, the operation log acquiring function carrying out an operation in accordance with the request, thereafter, transmits a result of the operation to the log linking server;

the web system further including an external reproducing portion capable of being connected to the log linking server, the external reproducing portion displaying a table of the identifiers preserved in the log linking server, wherein a specific identifier is selected from the identifiers displayed in the table, the specific identifier is transmitted to the log linking server, a content of the web page related to the selected identifier and the operation log on the web page are acquired, and a content of an operation is outputted in accordance with the operation log;

when the web page formed by the web server is transmitted to the web browser, the log linking server receives the content of the web page in addition to the identifier related to the web page, and the content is preserved by being related to the identifier related to the web page;

the external reproducing portion receives the content of the web page related to the selected identifier and the operation log from the log linking server;

the web browser transmits the identifier inserted to the web page by the operation log acquiring function executed on the web browser to the log linking server; and the log linking server receives the identifier from the web browser, and preserves the identifier along with the identifier received from the web server;

the web system further including a cache temporarily preserving the content of the web page, and transmitting the content to the web browser, when the content of the web page corresponding to the request from the web browser is temporarily preserved;

when the web browser receives the web page from the cache, the web browser designates the identifier related to the web page received from the cache as a first identifier, converts the first identifier into a second identifier uniquely related to the first identifier, and transmits the second identifier as the identifier to the log linking server; and when the log linking server receives a request for transmitting the content of the web page of the identifier designated from the external reproducing portion, in a case where the designated identifier is the second identifier, the log linking server converts the second identifier into the first identifier, and transmits the content of the web page related to the first identifier to the external reproducing portion.

\* \* \* \* \*